United States Patent
Rico Alvarino et al.

(10) Patent No.: US 11,877,190 B2
(45) Date of Patent: Jan. 16, 2024

(54) INDICATING ORIGINAL DATA COMMUNICATIONS

(71) Applicant: QUALCOMM Incorporated, San Diego, CA (US)

(72) Inventors: Alberto Rico Alvarino, San Diego, CA (US); Xiao Feng Wang, San Diego, CA (US); Umesh Phuyal, San Diego, CA (US); Bharat Shrestha, San Diego, CA (US); Le Liu, Fremont, CA (US); Ayan Sengupta, San Diego, CA (US); Jun Ma, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/224,829

(22) Filed: Apr. 7, 2021

(65) Prior Publication Data

US 2021/0321441 A1    Oct. 14, 2021

Related U.S. Application Data

(60) Provisional application No. 63/008,154, filed on Apr. 10, 2020, provisional application No. 63/007,308, filed on Apr. 8, 2020.

(51) Int. Cl.
*H04L 1/18*    (2023.01)
*H04W 28/12*    (2009.01)
(Continued)

(52) U.S. Cl.
CPC ........... *H04W 28/12* (2013.01); *H04L 1/1819* (2013.01); *H04L 1/1822* (2013.01);
(Continued)

(58) Field of Classification Search
None
See application file for complete search history.

(56) References Cited

U.S. PATENT DOCUMENTS

| 11,323,902 B2 | 5/2022 | Kwak et al. |
| 2015/0049727 A1* | 2/2015 | Wentink ............... H04W 74/04 370/329 |

(Continued)

FOREIGN PATENT DOCUMENTS

| GB | 2573577 A | 11/2019 |
| GB | 2576205 A | 2/2020 |

(Continued)

OTHER PUBLICATIONS

Huawei, et al., "Discussion on HARQ for NTN", 3GPP Draft, R1-1908050, 3GPP TSG RAN WG1 Meeting #98, 3rd Generation Partnership Project (3GPP), Mobile Competence Centre, 650, Route Des Lucioles, F-06921 Sophia-Antipolis Cedex, France, vol. RAN WG1. No. Prague. Czech Republic, Aug. 26, 2019-Aug. 30, 2019, Aug. 17, 2019 (Aug. 17, 2019), 5 Pages, XP051764673, Retrieved from the Internet: URL:http://www.3gpp.org/ftp/tsg_ran/WG1_RL1/TSGR1_98/Docs/R1-1908050.zip [retrieved on Aug. 17, 2019] p. 1-p. 4, figure 2.

(Continued)

*Primary Examiner* — Brandon M Renner
(74) *Attorney, Agent, or Firm* — Holland & Hart LLP

(57) ABSTRACT

Methods, systems, and devices for wireless communications are described. A receiving device may use enhanced techniques for determining whether a transmission is scheduled to include new data when a mode for reporting acknowledgment feedback is disabled for one or more hybrid automatic repeat request (HARQ) processes used by the receiving device. An enhanced technique may include increasing a quantity of bits used to convey an indication of whether a scheduled data transmission includes new data. An enhanced (Continued)

technique may include monitoring a duration between transmissions scheduled by different control messages based on a timing parameter that indicates a maximum time between transmissions of a data set and corresponding transmission including the data set.

61 Claims, 16 Drawing Sheets

(51) Int. Cl.
*H04W 72/1273* (2023.01)
*H04L 1/1812* (2023.01)
*H04L 1/1867* (2023.01)
*H04W 72/0446* (2023.01)
*H04L 1/1825* (2023.01)
*H04L 1/1829* (2023.01)
*H04L 1/1822* (2023.01)
*H04W 72/23* (2023.01)
*H04W 72/50* (2023.01)
*H04W 84/06* (2009.01)

(52) U.S. Cl.
CPC .......... *H04L 1/1825* (2013.01); *H04L 1/1854* (2013.01); *H04L 1/1887* (2013.01); *H04L 1/1896* (2013.01); *H04W 72/0446* (2013.01); *H04W 72/1273* (2013.01); *H04W 72/23* (2023.01); *H04W 72/535* (2023.01); *H04W 84/06* (2013.01)

(56) References Cited

U.S. PATENT DOCUMENTS

| | | | |
|---|---|---|---|
| 2015/0078270 A1 | 3/2015 | Seo et al. | |
| 2018/0048432 A1* | 2/2018 | Sun | H04L 1/1819 |
| 2018/0205441 A1* | 7/2018 | Asterjadhi | H04W 74/06 |
| 2019/0052416 A1 | 2/2019 | Babaei et al. | |
| 2019/0182830 A1 | 6/2019 | Chen et al. | |
| 2019/0306876 A1* | 10/2019 | Golitschek Edler von Elbwart ... | H04W 72/0446 |
| 2019/0394009 A1 | 12/2019 | Yoshimoto et al. | |
| 2020/0229240 A1* | 7/2020 | Zhang | H04W 56/0045 |
| 2020/0328848 A1 | 10/2020 | He et al. | |
| 2020/0412485 A1 | 12/2020 | Wang et al. | |
| 2021/0007126 A1 | 1/2021 | Su et al. | |
| 2021/0274327 A1 | 9/2021 | Zhao | |
| 2021/0274492 A1* | 9/2021 | Yin | H04L 1/1854 |
| 2021/0321299 A1 | 10/2021 | Rico Alvarino et al. | |
| 2021/0385029 A1 | 12/2021 | Guo et al. | |
| 2022/0022241 A1* | 1/2022 | Zhang | H04W 72/1273 |
| 2022/0030661 A1* | 1/2022 | Jeong | H04W 72/0406 |
| 2022/0045803 A1* | 2/2022 | Lin | H04L 1/1822 |
| 2022/0159674 A1* | 5/2022 | Deng | H04L 5/0053 |
| 2022/0191851 A1* | 6/2022 | Park | H04W 76/28 |
| 2022/0279489 A1 | 9/2022 | Zhao | |
| 2022/0294591 A1* | 9/2022 | Liu | H04L 5/0091 |

FOREIGN PATENT DOCUMENTS

| | | |
|---|---|---|
| WO | WO-2018201005 A1 | 11/2018 |
| WO | WO-2019157669 A1 | 8/2019 |
| WO | WO-2019160737 A1 | 8/2019 |
| WO | WO-2020065530 A1 | 4/2020 |

OTHER PUBLICATIONS

Mediatek Inc: "Delay-Tolerant Re-Transmission Mechanisms in NR-NTN", 3GPP Draft, 3GPP TSG RAN WG1 Meeting #97, R1-1906466-Mediatek-Delay-Tolerant Re-Transmission Mechanisms for NR-NTN, 3rd Generation Partnership Project (3GPP), Mobile Competence Centre, 650, Route Des Lucioles, F-06921 Sophia-Ant vol. RAN WG1, No. Reno, Nevada, USA, May 13, 2019-May 17, 2019, May 13, 2019 (May 13, 2019), XP051727916, 6 Pages, Retrieved from the Internet: URL:http://www.3gpp.org/ftp/Meetings%5F3GPP%5FSYNC/RAN1/Docs/R1%2D1906466%2Ezip [retrieved on May 13, 2019] p. 1-p. 6.

Huawei, et al.,"Discussion on Disabling HARQ in NTN", 3GPP Draft, 3GPP TSG-RAN WG2 Meeting 107, R2-1911236, Discussion on Disabling HARQ in NTN, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051768996, 3 Pages, Retrieved from the Internet: URL: http://www.3gpp.org/ftp/tsg_ran/WG2_RL2/TSGR2_107/Docs/R2-1911236.zip. [retrieved on Aug. 16, 2019] Section 2.1 Section 2.2.

International Search Report and Written Opinion—PCT/US2021/026365—ISA/EPO—dated Jun. 16, 2021.

Mediatek Inc: "Summary Delay-Tolerant re-Transmission Mechanisms in NR-NTN", 3GPP Draft, 3GPP TSG RAN WG1 Meeting #96bis, R1 -1905840, MEDIATEK-Summary Delay-Tolerant re-Transmission Mechanisms in NR-NTN, 3rd Generation Partnership Project (3GPP), Mobile Competence Centre, 650, Route Des Lucioles, F-06921 Sophia, vol. Ran WG1, No. Xian, China, Apr. 8, 2019-Apr. 12, 2019, Apr. 15, 2019 (Apr. 15, 2019), XP051707886, 7 Pages, Retrieved from the Internet: URL: http://www.3gpp.org/ftp/tsg%5Fran/WG1%5FRL1/TSGR1%5F96b/Docs/R1%2D1905840%2Ezip. [retrieved on Apr. 15, 2019] Section 4.

OPPO: "Discussion on CG and SPS in NTN", 3GPP Draft, 3GPP TSG-RAN WG2 Meeting #108, R2-1915166, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051817062, 3 Pages, Retrieved from the Internet: URL: https://ftp.3gpp.org/tsg_ran/WG2_RL2/TSGR2_108/Docs/R2-1915166.zip. R2-1915166.doc [retrieved on Nov. 8, 2019] Section 1 Section 2.

\* cited by examiner

INDICATING ORIGINAL DATA COMMUNICATIONS

CROSS REFERENCE

The present Application for Patent claims the benefit of U.S. Provisional Patent Application No. 63/008,154 by RICO ALVARINO et al., entitled "OUT-OF-ORDER HANDLING WITHOUT FLOW CONTROL FEEDBACK," filed Apr. 10, 2020 and U.S. Provisional Patent Application No. 63/007,308 by RICO ALVARINO et al., entitled "INDICATING ORIGINAL DATA COMMUNICATIONS," filed Apr. 8, 2020, each of which are assigned to the assignee hereof, and expressly incorporated by reference herein.

INTRODUCTION

The following relates to wireless communications and more specifically to managing data communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station and wireless device may perform multiple communications of a same set of data to increase a likelihood that the set of data will be successfully received and decoded by the receiving device.

SUMMARY

A method of wireless communications at a UE is described. The method may include receiving a first control message including a first indication that one of original data or repeated data is to be included in a first data transmission scheduled by the first control message, the first indication having a single bit. The method may include receiving a configuration message configuring a mode that disables acknowledgment feedback reporting for the UE. The method may include receiving, based on the mode being configured for the UE, a second control message including a second indication that one of original data or repeated data is to be included in a second data transmission scheduled by the second control message, the second indication having a plurality of bits. The method may include communicating the second data transmission based on the second indication.

An apparatus for wireless communications at a UE is described. The apparatus may include a processor and memory coupled to the processor. The processor and memory may be configured to cause the apparatus to receive a first control message including a first indication that one of original data or repeated data is to be included in a first data transmission scheduled by the first control message, the first indication having a single bit. The processor and memory may further be configured to cause the apparatus to receive a configuration message configuring a mode that disables acknowledgment feedback reporting for the UE. The processor and memory may be configured to cause the apparatus to receive, based on the mode being configured for the UE, a second control message including a second indication that one of original data or repeated data is to be included in a second data transmission scheduled by the second control message, the second indication having a plurality of bits. The processor and memory may be further configured to cause the apparatus to communicate the second data transmission based on the second indication.

Another apparatus for wireless communications at a UE is described. The apparatus may include means for receiving a first control message including a first indication that one of original data or repeated data is to be included in a first data transmission scheduled by the first control message, the first indication having a single bit. The apparatus may include means for a configuration message configuring a mode that disables acknowledgment feedback reporting for the UE. The apparatus may include means for receiving, based on the mode being configured for the UE, a second control message including a second indication that one of original data or repeated data is to be included in a second data transmission scheduled by the second control message, the second indication having a plurality of bits. The apparatus may include means for communicating the second data transmission based on the second indication.

A non-transitory computer-readable medium storing code for wireless communications at a UE is described. The code may include instructions executable by a processor to receive a first control message including a first indication that one of original data or repeated data is to be included in a first data transmission scheduled by the first control message, the first indication having a single bit. The instructions may be executable by the processor to receive a configuration message configuring a mode that disables acknowledgment feedback reporting for the UE. The instructions may be executable by the processor to receive, based on the mode being configured for the UE, a second control message including a second indication that one of original data or repeated data is to be included in a second data transmission scheduled by the second control message, the second indication having a plurality of bits. The instructions may be executable by the processor to communicate the second data transmission based on the second indication.

Some examples of the method, apparatuses, and non-transitory computer-readable medium described herein may further include operations, features, means, or instructions for disabling acknowledgement feedback reporting for a first hybrid automatic repeat request (HARQ) process of a set of HARQ processes configured for the UE based on the configuration message, where the second indication may be associated with the first HARQ process, and where acknowledgement feedback reporting remains enabled for a second HARQ process of the set of HARQ processes based on the configuration message.

Some examples of the method, apparatuses, and non-transitory computer-readable medium described herein may further include operations, features, means, or instructions for receiving control signaling indicating that the second indication includes the plurality of bits based on the mode that disables acknowledgment feedback reporting being configured for the UE.

Some examples of the method, apparatuses, and non-transitory computer-readable medium described herein may further include operations, features, means, or instructions for determining that a first field for indicating original data transmission or repeated data transmission may have a first length that spans one bit based on a second mode that enables acknowledgement feedback reporting being configured for the UE, where the first control message includes the first field.

Some examples of the method, apparatuses, and non-transitory computer-readable medium described herein may further include operations, features, means, or instructions for determining that the first field may have a second length that spans multiple bits based on the mode that disables acknowledgment feedback reporting being configured for the UE, where the second control message includes the first field.

In some examples of the method, apparatuses, and non-transitory computer-readable medium described herein, the first control message may be received based on the first length of the first field, the first field of the first control message including the first indication, and the second control message may be received based on the second length of the first field, the first field of the second control message including the second indication.

Some examples of the method, apparatuses, and non-transitory computer-readable medium described herein may further include operations, features, means, or instructions for receiving, based on the mode that disables acknowledgment feedback reporting being configured for the UE, a third control message including a third indication that one of original data or repeated data may be to be included in a third data transmission scheduled by the third control message, and determining that the third data transmission includes an original set of data based on the third indication and the second indication.

Some examples of the method, apparatuses, and non-transitory computer-readable medium described herein may further include operations, features, means, or instructions for comparing the third indication of the third control message with the second indication of the second control message, where the determining that the third data transmission includes the original set of data may be based on a second value of the second indication being different than a third value of the third indication.

Some examples of the method, apparatuses, and non-transitory computer-readable medium described herein may further include operations, features, means, or instructions for determining that a second field for supporting acknowledgment feedback reporting may be alternatively configured to indicate original data transmission or repeated data transmission based on the mode that disables acknowledgment feedback reporting being configured for the UE, where the second control message includes the first field and the second field.

In some examples of the method, apparatuses, and non-transitory computer-readable medium described herein, the first field includes a first portion of the second indication and the second field includes a second portion of the second indication.

In some examples of the method, apparatuses, and non-transitory computer-readable medium described herein, the second field may be associated with a disabled hybrid automatic repeat request process.

Some examples of the method, apparatuses, and non-transitory computer-readable medium described herein may further include operations, features, means, or instructions for receiving, based on the mode that disables acknowledgment feedback reporting being configured for the UE, a third control message including a third indication that one of original data or repeated data may be to be included in a third data transmission scheduled by the third control message, and determining that the third data transmission includes an original set of data based on the second indication and the third indication.

Some examples of the method, apparatuses, and non-transitory computer-readable medium described herein may further include operations, features, means, or instructions for comparing the third indication of the third control message with the second indication of the second control message, where the determining that the third data transmission includes the original set of data may be based on a second value of the second indication being different than a third value of the third indication.

Some examples of the method, apparatuses, and non-transitory computer-readable medium described herein may further include operations, features, means, or instructions for determining that a second field for padding may be alternatively configured to indicate original data transmission or repeated data transmission based on the mode that disables acknowledgment feedback reporting being configured for the UE, where the second control message includes the first field and the second field, the first field of the second control message includes a first portion of the second indication, and the second field of the second control message includes a second portion of the second indication.

Some examples of the method, apparatuses, and non-transitory computer-readable medium described herein may further include operations, features, means, or instructions for determining that a second field for indicating redundancy versions may be further configured to indicate original data transmission or repeated data transmission based on the mode that disables acknowledgment feedback reporting being configured for the UE, where the second control message includes the first field and the second field.

In some examples of the method, apparatuses, and non-transitory computer-readable medium described herein, the first field includes a first portion of the second indication, and the second field includes a second portion of the second indication.

Some examples of the method, apparatuses, and non-transitory computer-readable medium described herein may further include operations, features, means, or instructions for receiving, based on the mode that disables acknowledgment feedback reporting being configured for the UE, a third control message including a fourth indication that one of original data or repeated data may be to be included in a third data transmission scheduled by the third control message and a fifth indication that the third data transmission may be scheduled to use one of the set of redundancy versions, where the second control message includes a third indication that the second data transmission may be scheduled to use one of a set of redundancy versions, and determining that the third data transmission includes an original set of data based on the second indication, the third indication, the fourth indication, and the fifth indication.

Some examples of the method, apparatuses, and non-transitory computer-readable medium described herein may further include operations, features, means, or instructions for comparing the fourth indication of the third control message with the second indication of the second control message and the fifth indication of the third control message with the third indication of the second control message, where the determining that the third data transmission includes the original set of data may be based on a fourth value of the fourth indication being equal to a second value of the second indication.

In some examples of the method, apparatuses, and non-transitory computer-readable medium described herein, the determining that the third data transmission includes the original set of data may be based on a fifth value of the fifth indication of the third control message being equal to a third value of the third indication of the second control message.

In some examples of the method, apparatuses, and non-transitory computer-readable medium described herein, the determining that the third data transmission includes the original set of data may be based on the fifth indication of the third control message indicating a redundancy version of the set of redundancy versions that may be associated with original data.

Some examples of the method, apparatuses, and non-transitory computer-readable medium described herein may further include operations, features, means, or instructions for receiving control signaling including a sequence of the set of redundancy versions, the sequence including a first amount of repetitions of each of the set of redundancy versions, where determining that the third data transmission includes the original set of data may be based on the fifth indication of the third control message indicating a second amount of repetitions for a redundancy version in the sequence that may be greater than the first amount of repetitions.

Some examples of the method, apparatuses, and non-transitory computer-readable medium described herein may further include operations, features, means, or instructions for decoding the second control message based on the mode that disables acknowledgment feedback reporting being configured for the UE, and identifying that a downlink transmission may be scheduled by the second control message includes a downlink data transmission based on the second control message.

Some examples of the method, apparatuses, and non-transitory computer-readable medium described herein may further include operations, features, means, or instructions for identifying that the downlink data transmission includes an original set of data based on the second indication included in the second control message, and receiving, from a base station, the original set of data in the downlink data transmission, the original set of data being transmitted by the base station for an initial time in the downlink data transmission.

Some examples of the method, apparatuses, and non-transitory computer-readable medium described herein may further include operations, features, means, or instructions for identifying that the downlink data transmission includes a repeated set of data based on the second indication included in the second control message, and receiving, from a base station, the repeated set of data in the downlink data transmission, the repeated set of data being previously transmitted in a prior downlink data transmission.

Some examples of the method, apparatuses, and non-transitory computer-readable medium described herein may further include operations, features, means, or instructions for decoding the second control message based on the mode that disables acknowledgment feedback reporting being configured for the UE, and identifying that an uplink data transmission may be scheduled by the second control message based on the second control message.

Some examples of the method, apparatuses, and non-transitory computer-readable medium described herein may further include operations, features, means, or instructions for identifying that the uplink data transmission includes an original set of data based on the second indication included in the second control message, generating the uplink data transmission including the original set of data based on the second indication, and transmitting, to a base station, the original set of data in the uplink data transmission, the original set of data being transmitted by the UE for an initial time in the uplink data transmission.

Some examples of the method, apparatuses, and non-transitory computer-readable medium described herein may further include operations, features, means, or instructions for identifying that the uplink data transmission includes a repeated set of data based on the second indication included in the second control message, generating the uplink data transmission including the repeated set of data based on the second indication, and transmitting, to a base station, the repeated set of data in the uplink data transmission, the repeated set of data being previously transmitted by the UE in a prior uplink data transmission.

A method of wireless communications at a UE is described. The method may include receiving a configuration message configuring a mode that disables acknowledgment feedback reporting for the UE. The method may include receiving a first control message including a first indication that original data is to be included in a first data transmission scheduled by the first control message, the first data transmission being associated with a HARQ process. The method may include receiving, after the first control message, a second control message including a second indication that repeated data is to be included in a second data transmission scheduled by the second control message, the second control message being associated with the HARQ process. The method may include communicating, based on the mode being configured for the UE, an original set of data in the second data transmission based on a timing threshold associated with receiving the first control message being exceeded.

An apparatus for wireless communications at a UE is described. The apparatus may include a processor and memory coupled to the processor. The processor and memory may be configured to cause the apparatus to receive a configuration message configuring a mode that disables acknowledgment feedback reporting for the UE. The processor and memory may be configured to cause the apparatus to receive a first control message including a first indication that original data is to be included in a first data transmission scheduled by the first control message, the first data transmission being associated with a HARQ process. The processor and memory may be configured to cause the apparatus to receive, after the first control message, a second control message including a second indication that repeated data is to be included in a second data transmission scheduled by the second control message, the second control message being associated with the HARQ process. The processor and memory may be configured to cause the apparatus to communicate, based on the mode being configured for the UE, an original set of data in the second data transmission based on a timing threshold associated with receiving the first control message being exceeded.

Another apparatus for wireless communications at a UE is described. The apparatus may include means for receiving a configuration message configuring a mode that disables acknowledgment feedback reporting for the UE. The apparatus may include means for receiving a first control message including a first indication that original data is to be included in a first data transmission scheduled by the first control message, the first data transmission being associated with a HARQ process. The apparatus may include means for receiving, after the first control message, a second control message including a second indication that repeated data is to be included in a second data transmission scheduled by the second control message, the second control message being associated with the HARQ process. The apparatus may include means for communicating, based on the mode being configured for the UE, an original set of data in the second data transmission based on a timing threshold associated with receiving the first control message being exceeded.

A non-transitory computer-readable medium storing code for wireless communications at a UE is described. The code may include instructions executable by a processor to receive a configuration message configuring a mode that disables acknowledgment feedback reporting for the UE. The instructions may be executable by the processor to receive a first control message including a first indication that original data is to be included in a first data transmission scheduled by the first control message, the first data transmission being associated with a HARQ process. The instructions may be executable by the processor to receive, after the first control message, a second control message including a second indication that repeated data is to be included in a second data transmission scheduled by the second control message, the second control message being associated with the HARQ process. The instructions may be executable by the processor to communicate, based on the mode being configured for the UE, an original set of data in the second data transmission based on a timing threshold associated with receiving the first control message being exceeded.

Some examples of the method, apparatuses, and non-transitory computer-readable medium described herein may further include operations, features, means, or instructions for receiving an indication of the timing threshold, where the timing threshold may be based on a threshold quantity of slots.

Some examples of the method, apparatuses, and non-transitory computer-readable medium described herein may further include operations, features, means, or instructions for determining that a quantity of slots located between the first slot and the second slot exceeds the threshold quantity of slots, and determining that the second data transmission includes the original set of data based on the quantity of slots located between the first slot and the second slot exceeding the threshold quantity of slots.

Some examples of the method, apparatuses, and non-transitory computer-readable medium described herein may further include operations, features, means, or instructions for decoding the second control message based on the mode that disables acknowledgment feedback reporting being configured for the UE, identifying that a downlink data transmission may be scheduled by the second control message based on the second control message, and receiving, from a base station, the original set of data in the downlink data transmission based on the quantity of slots located between the first slot and the second slot exceeding the threshold quantity of slots, the original set of data being transmitted by the base station for an initial time in the downlink data transmission.

Some examples of the method, apparatuses, and non-transitory computer-readable medium described herein may further include operations, features, means, or instructions for decoding the second control message based on the mode that disables acknowledgment feedback reporting being configured for the UE, identifying that an uplink data transmission may be scheduled by the second control message based on the second control message, generating the uplink data transmission including the original set of data based on the identifying, and transmitting, to a base station, the original set of data in the uplink data transmission based on the quantity of slots located between the first slot and the second slot exceeding the threshold quantity of slots, the original set of data being transmitted by the UE for an initial time in the uplink data transmission.

Some examples of the method, apparatuses, and non-transitory computer-readable medium described herein may further include operations, features, means, or instructions for identifying first data resources in the first data transmission scheduled by the first control message in a first slot, identifying second data resources in the second data transmission scheduled by the second control message in a second slot, determining that a quantity of slots located between the first slot and the second slot exceeds the threshold quantity of slots, and determining that the second data transmission includes the original set of data based on the quantity of slots located between the first slot and the second slot exceeding the threshold quantity of slots.

Some examples of the method, apparatuses, and non-transitory computer-readable medium described herein may further include operations, features, means, or instructions for receiving an indication of the timing threshold, where the timing threshold may be based on a threshold duration.

Some examples of the method, apparatuses, and non-transitory computer-readable medium described herein may further include operations, features, means, or instructions for initiating a timer based on receiving the first control message, determining that a value of the timer when the second control message may be received exceeds the threshold duration, and determining that the second data transmission includes the original set of data based on the value of the timer exceeding the threshold duration.

Some examples of the method, apparatuses, and non-transitory computer-readable medium described herein may further include operations, features, means, or instructions for receiving a first data message scheduled by the first control message, initiating a timer based on receiving the first data message, receiving a second data message scheduled by the second control message, determining that a value of the timer when the second data message may be received exceeds the threshold duration, and determining that the second data transmission includes the original set of data based on the value of the timer exceeding the threshold duration.

A method of wireless communications at a base station is described. The method may include transmitting a first control message including a first indication that one of original data or repeated data is to be included in a first data transmission scheduled by the first control message for a UE, the first indication having a single bit. The method may include transmitting a configuration message configuring a mode that disables acknowledgment feedback reporting for the UE. The method may include transmitting, based on the mode being configured for the UE, a second control message including a second indication that one of original data or repeated data is to be included in a second data transmission scheduled by the second control message, the second indication having a plurality of bits. The method may include communicating the second data transmission based on the second indication.

An apparatus for wireless communications at a base station is described. The apparatus may include a processor and memory coupled to the processor. The processor and memory may be configured to cause the apparatus to transmit a first control message including a first indication that one of original data or repeated data is to be included in a first data transmission scheduled by the first control message for a UE, the first indication having a single bit. The processor and memory may be configured to cause the apparatus to transmit a configuration message configuring a mode that disables acknowledgment feedback reporting for the UE. The processor and memory may be configured to cause the apparatus to transmit, based on the mode being configured for the UE, a second control message including a second indication that one of original data or repeated data is to be included in a second data transmission scheduled by the second control message, the second indication having a plurality of bits. The processor and memory may be configured to cause the apparatus to communicate the second data transmission based on the second indication.

Another apparatus for wireless communications at a base station is described. The apparatus may include means for transmitting a first control message including a first indication that one of original data or repeated data is to be included in a first data transmission scheduled by the first control message for a UE, the first indication having a single bit. The apparatus may include means for transmitting a configuration message configuring a mode that disables acknowledgment feedback reporting for the UE. The apparatus may include means for transmitting, based on the mode being configured for the UE, a second control message including a second indication that one of original data or repeated data is to be included in a second data transmission scheduled by the second control message, the second indication having a plurality of bits. The apparatus may include means for communicating the second data transmission based on the second indication.

A non-transitory computer-readable medium storing code for wireless communications at a base station is described. The code may include instructions executable by a processor to transmit a first control message including a first indication that one of original data or repeated data is to be included in a first data transmission scheduled by the first control message for a UE, the first indication having a single bit. The instructions may be executable by the processor to transmit a configuration message configuring a mode that disables acknowledgment feedback reporting for the UE. The instructions may be executable by the processor to transmit, based on the mode being configured for the UE, a second control message including a second indication that one of original data or repeated data is to be included in a second data transmission scheduled by the second control message, the second indication having a plurality of bits. The instructions may be executable by the processor to communicate the second data transmission based on the second indication.

Some examples of the method, apparatuses, and non-transitory computer-readable medium described herein may further include operations, features, means, or instructions for determining that a first field for indicating original data transmission or repeated data transmission may have a first length that spans one bit based on a second mode that enables acknowledgement feedback reporting being configured for the UE, where the first control message includes the first field and the first field includes the first indication.

Some examples of the method, apparatuses, and non-transitory computer-readable medium described herein may further include operations, features, means, or instructions for determining that the first field may have a second length that spans multiple bits based on the mode that disables acknowledgment feedback reporting being configured for the UE, where the second control message includes the first field and the first field of the second control message includes the second indication.

Some examples of the method, apparatuses, and non-transitory computer-readable medium described herein may further include operations, features, means, or instructions for determining that a second field for supporting acknowledgment feedback reporting may be alternatively configured to indicate original data transmission or repeated data transmission based on the mode that disables acknowledgment feedback reporting being configured for the UE, where the second control message includes the first field and the second field, the first field includes a first portion of the second indication, and the second field includes a second portion of the second indication.

Some examples of the method, apparatuses, and non-transitory computer-readable medium described herein may further include operations, features, means, or instructions for determining that a second field for padding may be alternatively configured to indicate original data transmission or repeated data transmission based on the mode that disables acknowledgment feedback reporting being configured for the UE, where the second control message includes the first field and the second field, the first field of the second control message includes a first portion of the second indication, and the second field of the second control message includes a second portion of the second indication.

Some examples of the method, apparatuses, and non-transitory computer-readable medium described herein may further include operations, features, means, or instructions for transmitting control signaling including a sequence of a set of redundancy versions.

In some examples of the method, apparatuses, and non-transitory computer-readable medium described herein, the sequence includes a first amount of repetitions of each redundancy version of the set of redundancy versions.

In some examples of the method, apparatuses, and non-transitory computer-readable medium described herein, the sequence includes a redundancy version of the set of redundancy versions that may be associated with original data.

In some examples of the method, apparatuses, and non-transitory computer-readable medium described herein, the base station is included in a non-terrestrial network (NTN).

A method of wireless communications at a base station is described. The method may include transmitting a configuration message configuring a mode that disables acknowledgment feedback reporting for the UE. The method may include transmitting a first control message comprising a first indication that original data is to be included in a first data transmission scheduled by the first control message, the first data transmission being associated with a HARQ process. The method may include transmitting, after the first control message, a second control message comprising a second indication that repeated data is to be included in a second data transmission scheduled by the second control message, the second control message being associated with the HARQ process. The method may include communicating, based at least in part on the mode being configured for the UE, an original set of data in the second data transmission based at least in part on a timing threshold associated with the first control message the first control message being exceeded.

An apparatus for wireless communications at a base station is described. The apparatus may include a processor and memory coupled to the processor. The processor and memory may be configured to cause the apparatus to transmit a configuration message configuring a mode that disables acknowledgment feedback reporting for the UE. The processor and memory may be configured to cause the apparatus to transmit a first control message comprising a first indication that original data is to be included in a first data transmission scheduled by the first control message, the first data transmission being associated with a HARQ process. The processor and memory may be configured to cause the apparatus to transmit, after the first control message, a second control message comprising a second indication that repeated data is to be included in a second data transmission scheduled by the second control message, the second control message being associated with the HARQ process. The processor and memory may be configured to cause the apparatus to communicate, based at least in part on the mode being configured for the UE, an original set of data in the second data transmission based at least in part on a timing threshold associated with the first control message the first control message being exceeded.

Another apparatus for wireless communications at a base station is described. The apparatus may include means for transmitting a configuration message configuring a mode that disables acknowledgment feedback reporting for the UE. The apparatus may include means for transmitting a first control message comprising a first indication that original data is to be included in a first data transmission scheduled by the first control message, the first data transmission being associated with a HARQ process. The apparatus may include means for transmitting, after the first control message, a second control message comprising a second indication that repeated data is to be included in a second data transmission scheduled by the second control message, the second control message being associated with the HARQ process. The apparatus may include means for communicating, based at least in part on the mode being configured for the UE, an original set of data in the second data transmission based at least in part on a timing threshold associated with the first control message the first control message being exceeded.

A non-transitory computer-readable medium storing code for wireless communications at a base station is described. The code may include instructions executable by a processor to transmit a configuration message configuring a mode that disables acknowledgment feedback reporting for the UE. The instructions may be executable by the processor to transmit a first control message comprising a first indication that original data is to be included in a first data transmission scheduled by the first control message, the first data transmission being associated with a HARQ process. The instructions may be executable by the processor to transmit, after the first control message, a second control message comprising a second indication that repeated data is to be included in a second data transmission scheduled by the second control message, the second control message being associated with the HARQ process. The instructions may be executable by the processor to communicate, based at least in part on the mode being configured for the UE, an original set of data in the second data transmission based at least in part on a timing threshold associated with the first control message the first control message being exceeded.

Some examples of the method, apparatuses, and non-transitory computer-readable medium described herein may further include operations, features, means, or instructions for transmitting an indication of the timing threshold, where the timing threshold may be based on a threshold quantity of slots.

Some examples of the method, apparatuses, and non-transitory computer-readable medium described herein may further include operations, features, means, or instructions for transmitting an indication of the timing threshold, where the timing threshold may be based on a threshold duration.

Some examples of the method, apparatuses, and non-transitory computer-readable medium described herein may further include operations, features, means, or instructions for transmitting a first data message scheduled by the first control message and transmitting a second data message scheduled by the second control message.

DETAILED DESCRIPTION

Figure 1:
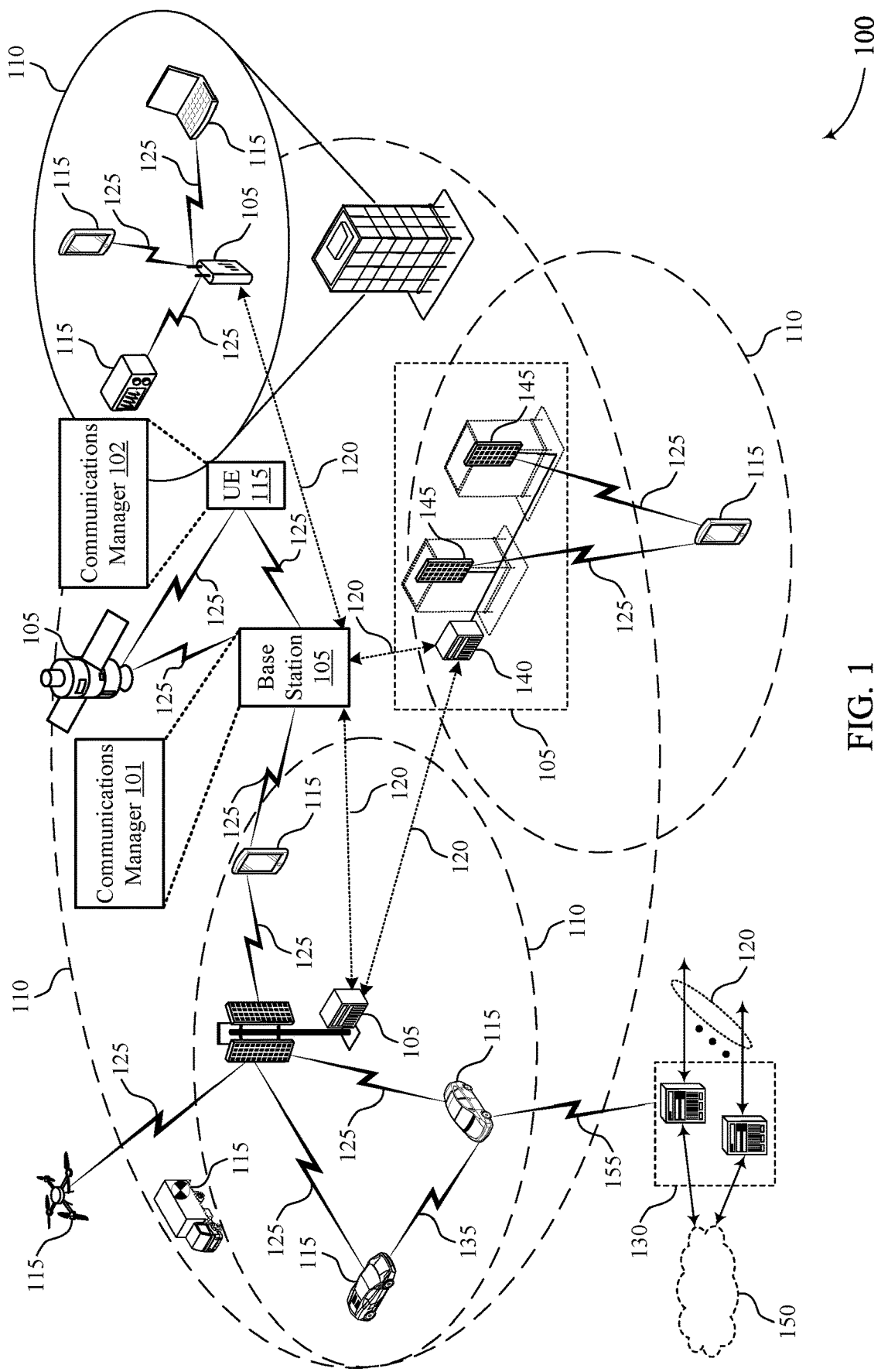
FIG. 1 illustrates an example of a system for wireless communications that supports indicating original data communications in accordance with one or more aspects of the present disclosure.

A single set of data may be included in multiple transmissions that are directed to a receiving device, where each of the transmissions may be referred to as a repetition and associated with a hybrid automatic repeat request (HARQ) process. The receiving device may report acknowledgment feedback (e.g., HARQ-acknowledgment (ACK) feedback)

for each repetition received at the receiving device, where a transmitting device may be configured to send repetitions until a positive ACK is received from the receiving device (or until a retransmission limit is reached). Thus, a number of repetitions may vary based on current channel conditions—e.g., less repetitions may be transmitted when a measured signal-to-noise ratio is above a threshold and positive ACKs are commonly received for the first or second repetition. To distinguish a transmission of repeated data from a transmission of original (or new) data—e.g., because the number of repetitions may vary—a control message used to schedule data transmission may include an indication of whether the scheduled data transmission carries original data or repeated data. The indication (which may be referred to as a new data indicator) may be implemented using a single bit that is held constant between control messages that schedule transmissions of a same set of data and flipped (or toggled) between control messages that schedule transmissions of a different set of data.

In some cases, one or more HARQ process associated with repeated transmissions of one or more sets of data may be performed without being accompanied by acknowledgement feedback—e.g., when a round-trip time for performing a transmission and receiving acknowledgement feedback exceeds a threshold (e.g., for non-terrestrial networks). In some cases, the number of repeated transmissions may vary—e.g., based on channel conditions observed by the transmitting device—though the transmitting device may not indicate a quantity of the repeated transmissions to the receiving device. In such cases, the receiving device may similarly use a new data indicator received in the control message to determine whether a data transmission is scheduled to include new data. However, if the receiving device misses a control message that includes a flipped new data indicator (e.g., from 0 to 1) and receives a subsequent control message that includes an again-flipped new data indicator (e.g., from 1 back to 0), the receiving device may fail to determine that the scheduled data transmission is scheduled to include new data relative to the previously received data transmission—e.g., based on detecting consecutive new data indicator values of 0. In some cases, a probability of a receiving device failing to determine a data transmission is scheduled to include new data is equivalent to a probability of the receiving device failing to decode a downlink control message.

To enable a receiving device to distinguish transmissions that are scheduled to include new data from transmissions that are scheduled to include repeated data with increased reliability, techniques for indicating whether transmissions are scheduled to include new data may be enhanced when acknowledgment feedback reporting is disabled for one or more HARQ processes associated with the transmissions.

In some examples, a field of a downlink control message (e.g., a scheduling message or uplink grant) that includes a new data indicator (which may be referred to as a new data indicator (NDI) field) may be increased in size (e.g., from one bit to multiple bits) when an acknowledgment feedback reporting mode is disabled. Additionally, or alternatively, unused fields (e.g., padding fields) of the downlink control message may be used to convey the new data indicator when acknowledgment feedback reporting is disabled (effectively increasing a size of the NDI field). In some cases, the unused fields include fields that are used to support acknowledgment feedback reporting when an acknowledgment feedback reporting mode is enabled (e.g., indexing fields, power control fields, resource indication fields, etc.). Additionally, or alternatively, information included in additional fields of the downlink control message (e.g., a coding field) may be used to supplement the information provided in the NDI field when an acknowledgment feedback reporting mode is disabled.

In some examples, a timing parameter may be used to supplement the information included in the NDI field when acknowledgment feedback reporting is disabled. The timing parameter may establish a threshold amount of time (e.g., measured in slots or milliseconds) between a transmission of new data and a transmission of repeated data. A receiving device may use the threshold amount of time to determine that a data transmission that appears to be scheduled for repeated data is actually scheduled for new data based on determining that a time for transmitting repeated transmissions of a set of data has expired.

By increasing a size of the NDI field, the probability of mistaking new data for repeated data may be decreased. Similarly, the probability of mistaking new data for repeated data may be decreased by using information in other fields to supplement the information included in the field that includes the new data indicator. Additionally, or alternatively, by introducing a time limit for transmissions of repeated data, the probability of mistaking new data for repeated data may be decreased. Decreasing the probability of mistaking new data for repeated data may decrease a bit error rate and/or packet failure rate of communications received at a communications device. In some examples, decreasing the packet failure rate may decrease a quantity of radio link control layer retransmissions of the packets, increasing a throughput of a wireless communications system and improving a user experience.

Aspects of the disclosure are initially described in the context of wireless communications systems. Specific examples are then described of exemplary control message configurations and exemplary operational sequences for indicating original data communications. Aspects of the disclosure are further illustrated by and described with reference to apparatus diagrams, system diagrams, and flowcharts that relate to indicating original data communications.

FIG. 1 illustrates an example of a wireless communications system 100 that supports indicating original data communications in accordance with one or more aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some examples, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands—e.g., in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A wireless communications system 100 may be configured to support the consecutive transmission of a same set of data. In some cases, all of the consecutive transmissions may be referred to as repeated transmissions or repetitions. In some cases, the first transmission may be referred to as conveying original (or new) data and the following transmissions may be referred to as carrying repeated data. In some cases, the first transmission may be referred to as an initial transmission and the second transmission may be referred to as repetitions.

The process of performing multiple transmissions of a same set of data may be referred to as a HARQ procedure, and the multiple transmissions may be referred to as HARQ transmissions. A HARQ procedure may include a combination of error detection (e.g., using a cyclic redundancy check (CRC)), forward error correction (FEC), and retransmission (e.g., automatic repeat request (ARQ)). A HARQ procedure may improve throughput at the medium access control (MAC) layer in poor radio conditions (e.g., low signal-to-noise conditions). That is, if the receiving device is unable to decode an initial transmission (e.g., due to short-term interference), the receiving device may be able to decode a following repetition—e.g., after the short-term interference has stopped or faded. Additionally, or alternatively, the receiving device may combine the received initial transmission and the received following repetition and decode (e.g., using signal combining techniques) a combined version of the transmissions. In some examples, a transmitting device and a receiving device may be configured to support multiple, concurrent HARQ processes. That is, a first HARQ process may be associated with a first set of data that is transmitted between the transmitting and receiving device using multiple transmissions, a second HARQ process may be associated with a second set of data that is transmitted between the transmitting and receiving device using multiple transmissions, and so on.

Signaling mechanisms may be used to enable a receiving device to distinguish between transmissions of new data and transmissions of repeated data. In some cases, downlink control information is configured to include a field for indicating whether a data transmission (e.g., uplink or downlink) scheduled by the downlink control information includes new data or repeated data. In some examples, this field has a length of one bit and includes a new data indicator, where a value of the new data indicator is flipped (or toggled) when a transmission carries new data relative to a previous transmission. For example, a downlink control message scheduling an initial transmission may include a new data indicator having a first value (e.g., 0). And downlink control messages scheduling repetitions of the initial transmission may also include new data indicators having the first value. Subsequently—e.g., after the data included in the initial transmission and repetitions is received and decoded by the receiving device—a downlink control message scheduling another initial transmission may include a new data indicator having a second value (e.g., 1). And downlink control messages scheduling repetitions of the other initial transmission may also include new data indicators having the second value. And so on.

To further increase a reliability of the transmission of the set of data, a wireless communications system 100 may be configured to support the consecutive transmissions of multiple versions of a same set of data. In some examples, an initial transmission is transmitted using a first set of coded bits and a repetition is transmitted using a second set of coded bits. The second set of coded bits may be different than the first set of coded bits. Thus, when the initial transmission is combined with the repetition, an effective coding rate for the communicated information may be decreased to increase a likelihood that the communicated information will be decoded. In some cases, the different versions of the same set of data may be referred to as redundancy versions. The wireless communications system 100 may support a number of redundancy versions that use different sets of bits (e.g., RV0, RV1, RV2, RV3, etc.). In some cases, transmissions performed using a first set of bits are performed according to a first redundancy version (e.g., RV0) and transmissions performed using a second set of bits are performed according to a second redundancy version (e.g., RV2).

In some examples, a redundancy version sequence is established for repeated transmissions. That is, the transmitting device may transmit an initial transmission in accordance with RV0, a first repetition in accordance with RV2, a second repetition in accordance with RV3, and a third repetition in accordance with RV1. In some examples, the redundancy cycle may repeat, and a fourth repetition may be transmitted in accordance with RV0, a fifth repetition may be transmitted in accordance with RV2, and so on. Signaling mechanisms may be used to enable a receiving device to distinguish between transmissions using different redundancy versions. For example, a downlink control message may include a coding field that indicates a redundancy version used for a scheduled transmission (e.g., a redundancy version (RV) identification (RVID) field). In some cases, control signaling (e.g., radio resource control (RRC) or downlink control information (DCI) messaging) may be used to indicate a pattern used for a redundancy version sequence.

To reduce a number of repeated transmissions performed by a transmitting device, a wireless communications system 100 may be configured to support the reporting of acknowledgment feedback to a transmitting device for one or more received transmissions.

Acknowledgment feedback may include positive acknowledgment (ACK) feedback and negative acknowledgment (NACK) feedback. In some examples, a receiving device transmits either an ACK or NACK after each transmission received from a transmitting device. When acknowledgment feedback reporting is combined with a HARQ procedure, the acknowledgement feedback for HARQ may be referred to as HARQ-ACK feedback. In some examples, after receiving an ACK from a receiving device, a transmitting device may include new data in a subsequent transmission to the receiving device. Otherwise, if the transmitting device receives a NACK, the transmitting device may include the same data in the subsequent transmission to the receiving device. Then, if an ACK is received for the subsequent transmission, the transmitting device may include new data in the following transmission to the receiving device. This way, a transmitting device may use a varying number of transmissions to communicate a set of data, increasing throughput when less transmissions are used and increasing reliability when more transmissions are used.

Signaling mechanisms may be used to support the reporting of HARQ-ACK feedback. In some examples, a control message includes one or more indexing fields that indicate an index for a transport block (or code block group) transmitted during data resources indicated by the control message. The index may indicate to a receiving device a position within a HARQ-ACK codebook where acknowledgment feedback for the transport block (or code block group) is to be included. The one or more indexing fields may include a downlink assignment indicator (DAI) field, a total DAI (tDAI) field, and/or a counter DAI (cDAI) field. The control message may also include one or more resource indication fields that indicate a location of uplink communication resources for reporting acknowledgment feedback relative to a location of uplink data resource scheduled by the control message. The one or more resource indication fields may include a data resource to uplink resource (e.g., a physical downlink share channel (PDSCH) to physical uplink control channel (PUCCH) resource) indicator and/or a data resource to HARQ resource (e.g., a PDSCH to HARQ-ACK resource) indicator. The control message may also include a power control field (e.g., a transmit power control (TPC) field) that indicates a power level for transmitting HARQ feedback. In some cases, a downlink control message may include multiple versions of the above fields for each HARQ process that is supported for communications between a base station 105 and UE 115.

A wireless communications system 100 may be a terrestrial and/or non-terrestrial network. A terrestrial network may include base stations that are located on the ground, while a non-terrestrial network may include base stations that are located in the air—e.g., base stations that are included on a payload of a satellites. Communications between base stations 105 and UEs 115 in non-terrestrial networks may be associated with large round-trip times. That is, the total time it takes to send a downlink transmission (e.g., an initial transmission) from a satellite-based base station 105 to a UE 115 and a corresponding uplink transmission (e.g., acknowledgment feedback for the initial transmission) from the UE 115 to the satellite-based base station 105 may be larger relative to sending corresponding downlink and uplink transmissions between a ground-based base station 105 and a UE 115.

As described above, a single set of data may be included in multiple transmissions sent to a receiving device (e.g., a base station 105 or UE 115), where each of the transmissions may be referred to as a repetition and associated with a HARQ process. As also described above, the receiving device may report acknowledgment feedback (e.g., HARQ-acknowledgment (ACK) feedback) for each repetition received at the receiving device, where a transmitting device (e.g., a base station 105 or UE 115) may be configured to send repetitions until a positive ACK is received from the receiving device (or until a retransmission limit is reached). Thus, a number of repetitions may vary based on current channel conditions—e.g., less repetitions may be transmitted when a measured signal-to-noise ratio is above a threshold and positive ACKs are commonly received for the first or second repetition. To distinguish a transmission of repeated data from a transmission of original (or new) data—e.g., because the number of repetitions may vary—a control message used to schedule data transmission may include an indication of whether the scheduled data transmission carries original data or repeated data. The indication (which may be referred to as a new data indicator) may be implemented using a single bit that is held constant between control messages that schedule transmissions of a same set of data and flipped (or toggled) between control messages that schedule transmissions of a different set of data.

In some cases, one or more HARQ process associated with repeated transmissions of one or more sets of data may be performed without being accompanied by acknowledgement feedback—e.g., when a round-trip time for performing a transmission and receiving acknowledgement feedback exceeds a threshold (e.g., for non-terrestrial networks). In some cases, the number of repeated transmissions may vary—e.g., based on channel conditions observed by the transmitting device—though the transmitting device may not indicate a quantity of the repeated transmissions to the receiving device. In such cases, the receiving device may similarly use a new data indicator received in the control message to determine whether a data transmission is scheduled to include new data. However, if the receiving device misses a control message that includes a flipped new data indicator (e.g., from 0 to 1) and receives a subsequent control message that includes an again-flipped new data indicator (e.g., from 1 back to 0), the receiving device may fail to determine that the scheduled data transmission is scheduled to include new data relative to the previously received data transmission—e.g., based on detecting consecutive new data indicator values of 0. In some cases, a probability of a receiving device failing to determine a data transmission is scheduled to include new data is equivalent to a probability of the receiving device failing to decode a downlink control message.

To enable a receiving device to distinguish transmissions that are scheduled to include new data from transmissions that are scheduled to include repeated data with increased reliability, techniques for indicating whether transmissions are scheduled to include new data may be enhanced when acknowledgment feedback reporting is disabled for one or more HARQ processes associated with the transmissions.

In some examples, a field of a downlink control message that includes a new data indicator (which may be referred to as an NDI field) may be increased in size when acknowledgment feedback reporting is disabled. Additionally, or alternatively, unused fields (e.g., padding fields) of the downlink control message may be used to convey the new data indicator when acknowledgment feedback reporting is disabled (effectively increasing a size of the NDI field). In some cases, the unused fields include fields that are used to support acknowledgment feedback reporting when acknowledgment feedback reporting is enabled (e.g., indexing fields, power control fields, resource indication fields, etc.). Additionally, or alternatively, information included in additional fields of the downlink control message (e.g., a coding field) may be used to supplement the information provided in the NDI field when acknowledgment feedback reporting is disabled. By increasing a size of the NDI field, the probability of mistaking new data for repeated data may be decreased. Similarly, the probability of mistaking new data for repeated data may be decreased by using information in other fields to supplement the information included in the field that includes the new data indicator.

In some examples, a timing parameter may be used to supplement the information included in the NDI field when acknowledgment feedback reporting is disabled. The timing parameter may establish a threshold amount of time (e.g., measured in slots or milliseconds) between a transmission of new data and a transmission of repeated data. A receiving device may use the threshold amount of time to determine that a data transmission that appears to be scheduled for repeated data is actually scheduled for new data based on determining that a time for transmitting repeated transmissions of a set of data has expired. By introducing a time limit for transmissions of repeated data, the probability of mistaking new data for repeated data may be decreased.

A base station 105 may include a communications manager 101. Communications manager 101 may be configured to transmit a control message that includes an indication of whether original data is scheduled to be included in a data transmission scheduled by the control message, where the indication is conveyed by a single bit in the control message. Communications manager 101 may also transmit a configuration message to UE 115 that disables one or more HARQ processes supported by the base station 105 and UE 115. After transmitting the configuration message, communications manager 101 may transmit another control message including an indication of whether a corresponding data transmission includes original data, where the indication is conveyed by multiple bits in the other control message. Communications manager 101 may then communicate (e.g., receive or transmit) the other data transmission based on whether the indication in the other control message indicates that the other data transmission includes new data.

A UE 115 may include a communications manager 102. Communications manager 102 may be configured to receive a control message that includes an indication of whether original (new) data is scheduled to be included in a data transmission scheduled by the control message, where the indication is represented by a single bit. Communications manager 102 may also be configured to receive a configuration message that configures a mode at the UE 115 that disables HARQ-ACK reporting for the UE 115 for one or more HARQ processes supported by the UE 115. After receiving the configuration message, the communications manager 102 may be configured to receive another control message that includes an indication of whether original (new) data is scheduled to be included in another data transmission scheduled by the other control message, where the indication is represented by multiple bits. In some cases, the second indication is associated with one of the one or more HARQ process disabled by the configuration message. Communications manager 102 may then communicate (e.g., receive or transmit) the other data transmission based on whether the indication in the other control message indicates that the other data transmission includes new data.

Communications manager 102 may also be configured to receive a configuration message that disables HARQ-ACK reporting for the UE 115 for one or more HARQ processes supported by the UE 115. Communications manager 102 may be configured to receive a control message that indicates whether new data is included in a corresponding data transmission that is associated with a HARQ process of the one or more disabled HARQ process. Communications manager 102 may be configured to receive another control message that indicates whether new data is included in another corresponding data transmission that is associated with the HARQ process. Communications manager 102 may communicate an original set of data for the HARQ process, even if the second indication indicates that new data is included in the other data transmission, based on a duration between the control messages and/or data messages exceeding a threshold.

Figure 2:
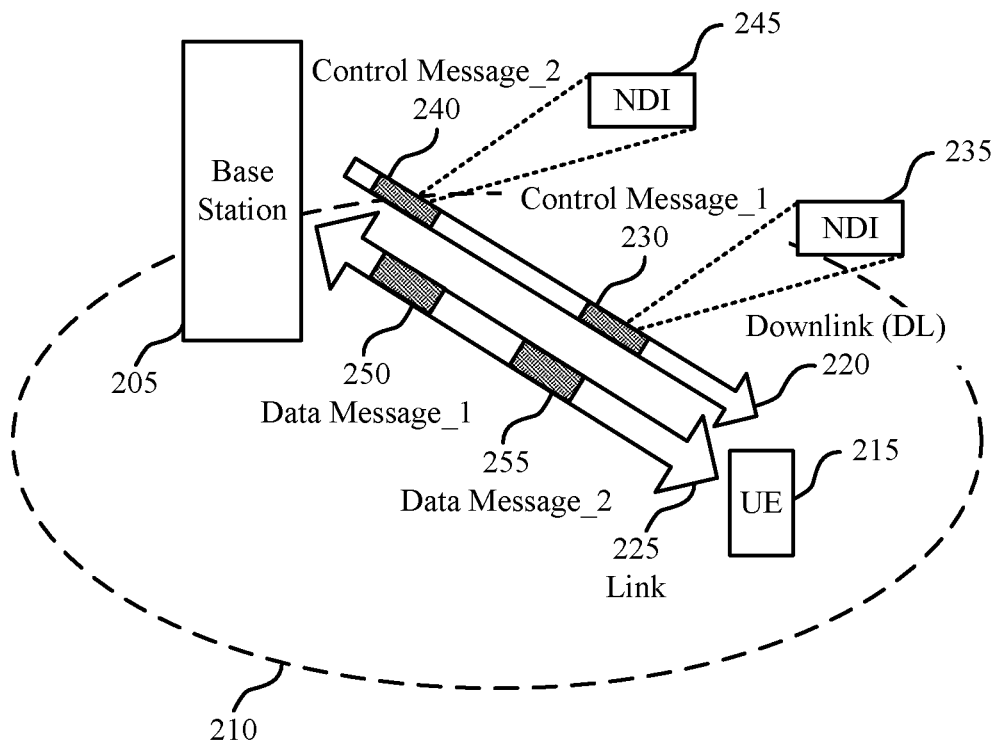
FIG. 2 illustrates an example of a wireless communications system that supports indicating original data communications in accordance with one or more aspects of the present disclosure.

FIG. 2 illustrates aspects of a wireless communications system that supports indicating original data communications in accordance with various aspects of the present disclosure.

Wireless communications system 200 may include base station 205 and UE 215 which may be examples of a base station or UE described above with reference to FIG. 1. Base station 205 and UE 215 may communicate with one another over downlink 220 and communication link 225 within coverage area 210, as described above with reference to FIG. 1. In some cases, wireless communications system 200 may include non-terrestrial aspects and base station 205 may be located on a payload of a satellite.

In some examples, a base station 205 may transmit first control message 230 to UE 215. First control message 230 may be used to schedule communication resources for first data message 250 and may include first new data indicator 235. First new data indicator may indicate whether new data is scheduled to be included in first data message 250. In some examples, first control message 230 schedules downlink control resources for first data message 250—e.g., when first control message 230 includes a downlink grant—and base station 205 transmits first data message 250 to UE 215. In other examples, first control message 230 schedules uplink control resources for first data message 250—e.g., when first control message 230 includes an uplink grant— and UE 215 transmits first data message 250 to base station 205.

Base station 205 may also transmit second control message 240 to UE 215. Second control message 240 may similarly be used to schedule communication resources for second data message 255 and may include second new data indicator 245. Second new data indicator 245 may indicate whether new data is scheduled to be included in second data message 255. In some examples, UE 215 may determine whether new data is to be included second data message 255 by comparing a value of second new data indicator 245 with a value of first new data indicator 235. If a value of second new data indicator 245 and first new data indicator 235 are different, then UE 215 may determine that second data message 255 includes new data—e.g., when a field for indicating new data includes one bit. In some examples, first new data indicator 235 and second new data indicator 245 may be associated with a same HARQ process.

As described above and herein, a receiving device (e.g., UE 215) may fail to distinguish between whether a data transmission is scheduled to include new data or repeated data when an indicator used to indicate new data uses a single bit and acknowledgment feedback reporting is disabled. To enable a receiving device to determine when data transmissions are scheduled to include new data and when transmissions are scheduled to include repeated data, techniques for indicating whether a data transmission is scheduled to include new data may be enhanced when acknowledgment feedback reporting is disabled.

In a first example for facilitating detection of transmissions that are scheduled for new data, a field of a downlink control message that includes a new data indicator (e.g., an NDI field) may be increased in size when acknowledgment feedback reporting is disabled. In some cases, a length of a field used to convey first new data indicator 235 and second new data indicator 245 may be expanded. For example, a length of the field may be increased from a single bit to multiple bits (e.g., 2 bits, 3 bits, etc.). Then, instead of checking whether the value of second new data indicator 245 has been flipped relative to the value of first new data indicator 235, UE 215 may check whether the value of second new data indicator 245 is different than the value of first new data indicator 235.

In some examples, a value of first new data indicator 235 may be set by base station 205 to be the binary value 00. When second data message 255 includes repeated data, a value of second new data indicator 245 may be set by the base station 205 to be the binary value 00. And when second data message 255 includes new data, a value of second new data indicator 245 may be set by the base station 205 to be the binary value 01. In both scenarios, UE 215 may compare the value of second new data indicator 245 against the value of first new data indicator 235, and in the second case, may determine that second data message 255 includes new data.

By increasing a size of the field used to convey new data indicators, a probability of the receiving device failing to determine a data transmission is scheduled to include new data may be reduced—e.g., from the probability of failing to decode a downlink control message, p, to $p^3$. More generally, a probability of the receiving device failing to determine a data transmission is scheduled to include new data may be reduced as a function of the number of available values for the new data indicator—that is, a probability of the receiving device failing to determine a data transmission may be $p^{K-1}$, where K is the number of available values for the new data indicator.

In a second example for facilitating detection of transmissions that are scheduled for new data, unused fields of the downlink control message may be used to convey the new data indicator when acknowledgment feedback reporting is disabled, effectively increasing a size of the NDI field. In some cases, a field that is used to support acknowledgment feedback reporting (e.g., a field used to indicate an index of a transport block (or code block group) and position of acknowledgment information for the transport block in a codebook, such as indexing field 310 of FIG. 3, a resource indication field, such as resource indication field 320 of FIG. 3, and/or a power control field, such as power control field 315 of FIG. 3) may be unused (e.g., set to 0) when acknowledgment feedback reporting is disabled. Thus, a set of bits (e.g., which may include a plurality of bits) used to represent first new data indicator 235 or second new data indicator 245 may be included in a field for indicating whether a data transmission is scheduled to include new data and one or more fields used for supporting acknowledgment feedback. In some cases, a first bit of first new data indicator 235 or second new data indicator 245 may be included in the field for indicating whether a data transmission is scheduled to include new data. And the remaining bits of first new data indicator 235 or second new data indicator 245 may be included in a second field (e.g., a DAI field) used for supporting acknowledgment feedback.

UE 215 may determine whether second data message 255 includes new data by comparing a value of the extended version of second new data indicator 245 with a value of the extended version of first new data indicator 235, as similarly described when a length of a field for indicating new data is expanded. Similarly, a field that is used to convey padding bits may be used to convey the new data indicator when acknowledgment feedback reporting is disabled. By using the bits of unused fields of a downlink control message, a probability of the receiving device failing to determine a data transmission is scheduled to include new data may be reduced as described above. Also, existing downlink control formats may be used.

In a third example for facilitating detection of transmissions that are scheduled for new data, information included in additional fields of the downlink control message may be used to supplement the information provided in the field that includes the new data indicator when acknowledgment feedback reporting is disabled. In some cases, a field that indicates a redundancy version used for a scheduled data transmission (e.g., an RVID field) is used to supplement the information provided in the field that includes first new data indicator 235 or second new data indicator 245. In some cases, first control message 230 may indicate that first data message 250 is scheduled to use a first redundancy version (e.g., RV2) and second control message 240 may indicate that second data message 255 is scheduled to use a second redundancy version (e.g., RV0). In some examples, the redundancy versions are used for the data messages in accordance with a predetermined sequence. In some cases, the sequence includes a repetition of the sequence {RV0, RV2, RV3, RV1}. In some cases, a maximum number of repetitions for each redundancy version may be included in the sequence—e.g., the sequence may include up to two instances of each RV {RV0 RV0, RV2, RV2, RV3, RV3, RV1, RV1}. Base station 205 may signal the predetermined sequence to UE 215 in control signaling (e.g., RRC signaling or DCI signaling). In some examples, one of the redundancy versions (e.g., RV0) is used for new data transmissions. In some examples, base station 205 signals the redundancy version used for new data transmissions to UE.

UE 215 may determine whether second data message 255 includes new data by first comparing a value of second new data indicator 245 with first new data indicator 235. If the values are different, UE 215 may determine that second data message 255 includes new data. If the values are the same, UE 215 may also compare a value of a second RVID field included in second control message 240 and a first RVID field included in first control message 230. When a predetermined redundancy version sequence is used, if the values of the first RVID field and the second RVID field are the same, UE 215 may determine that second data message 255 is scheduled to include new data. When a particular redundancy version is used for new data, if the value of the second RVID field corresponds to the particular redundancy version, UE 215 may determine that second data message 255 is scheduled to include new data.

By using the additional information provided by the RVID field, a probability of the receiving device failing to determine a data transmission is scheduled to include new data may be reduced. Also, existing downlink control formats may be used.

In a fourth example for facilitating detection of transmissions that are scheduled for new data, a timing parameter may be used to supplement the information included in the field that includes the new data indicator when acknowledgment feedback reporting is disabled. In some cases, a timing parameter may establish a maximum duration (which may be measured in slots or milliseconds) between an initial data transmission and a repetition. UE 215 may determine whether second data message 255 includes new data by first comparing a value of second new data indicator 245 with first new data indicator 235. If the values are different, UE 215 may determine that second data message 255 includes new data. If the values are the same, UE 215 may determine whether a duration between first data message 250 and second data message 255 is greater than a timing threshold. Additionally, or alternatively, UE 215 may determine whether a duration between first control message 230 and second control message 240 is greater than a timing threshold. If the duration between one or both of the messages is greater than the timing threshold, UE 215 may determine that second data message 255 is scheduled to include new data.

By using the additional information provided by measuring a time between control and/or data transmission, a probability of the receiving device failing to determine a data transmission is scheduled to include new data may be reduced. Also, existing downlink control formats may be used.

Figure 3:
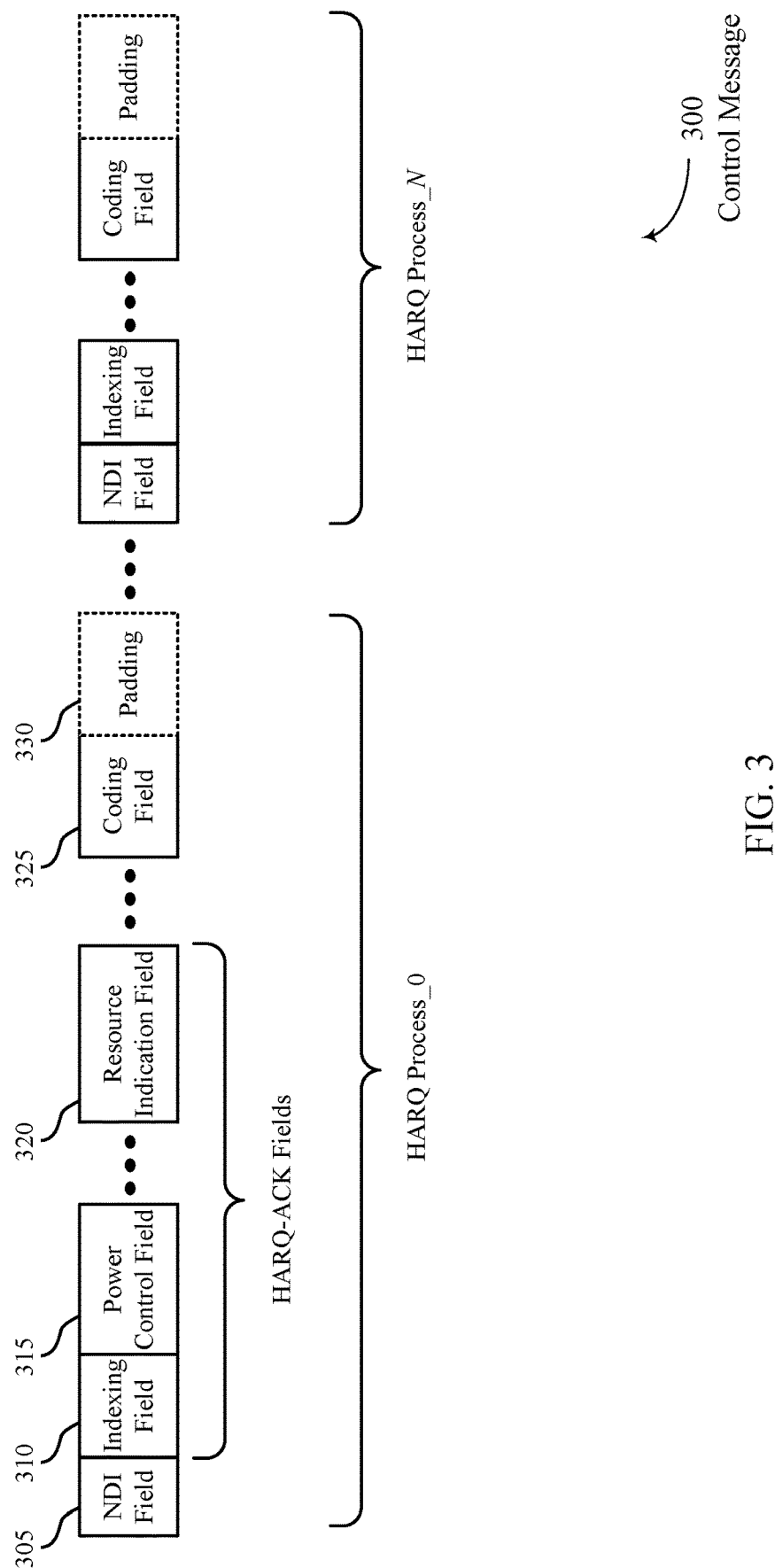
FIG. 3 illustrates an example of a control message configuration that supports indicating original data communications in accordance with one or more aspects of the present disclosure.

FIG. 3 illustrates aspects of a control message configuration that supports indicating original data communications in accordance with various aspects of the present disclosure.

Control message 300 may be a downlink control message. Control message 300 may be configured to schedule downlink or uplink resources; indicate whether new data or repeated data is scheduled to be transmitted during the downlink or uplink resources; indicate a redundancy version for the transmission, and/or indicate information that supports the reporting of acknowledgment feedback. Control message 300 may further be configured to support enhanced techniques for signaling whether a data transmission scheduled by control message 300 includes new data.

Control message 300 may include one or more NDI fields (such as NDI field 305), one or more indexing fields (such as indexing field 310), one or more power control fields (such as power control field 315), one or more resource indication fields (such as resource indication field 320), one or more coding fields (such as coding field 325), and one or more padding fields (such as padding field 330). In some cases, control message 300 includes an NDI field, indexing field, power control field, resource indication field, RVID field, and/or padding field for each HARQ process that is activated (or supported) for communications with a wireless device.

In some cases, NDI field 305, indexing field 310, power control field 315, resource indication field 320, coding field 325, and padding field 330 may be used to support the operation of a single HARQ process. In some cases, padding field 330 is omitted and a single padding field 330 is included at an end of control message 300. In some cases, indexing field 310, power control field 315, and resource indication field 320 may further be used to support HARQ-ACK reporting for the HARQ process and may be referred to as HARQ-ACK fields. Additional NDI, indexing, power control, resource indication, RVID, and padding fields may be used to support the operation of another HARQ process.

NDI field 305 may be configured to indicate whether a downlink or uplink data transmission scheduled by control message 300 includes is scheduled to include new data or repeated data. In some examples, NDI field 305 may be one bit in length. In other examples, NDI field 305 may be multiple bits in length. In some cases, NDI field 305 is one bit in length—e.g., when control message is configured in accordance with a first DCI format, or with a DCI indicating a HARQ process for which HARQ-ACK feedback is enabled. In other cases, NDI field 305 is multiple bits in length—e.g., when control message 300 is configured in accordance with a second DCI format that is selected for use when one or more HARQ processes are disabled for a UE, or with a DCI indicating a HARQ process for which HARQ-ACK feedback is enabled.

Indexing field 310 may be configured to indicate an index of a transport block (or code block group) that corresponds to a position of acknowledgment feedback for the transport block (or code block group) in an acknowledgment feedback codebook. Indexing field 310 may include multiple sub-fields including a tDAI field that is used to indicate a total number of transport blocks (or code block groups) represented in the acknowledgment feedback codebook. And a cDAI field that is used to indicate a position of the transport block (or code block group) relative to the other transport block (or code block groups) represented in the acknowledgment feedback codebook.

In some examples, indexing field 310 may be unused if indexing field 310 is configured to indicate indexing information for a HARQ process for which HARQ-ACK reporting has been disabled for communications with the UE. In some cases, HARQ-ACK reporting is disabled for a HARQ process when a round-trip time exceeds a threshold for communicating a type of data that is being communicated using the HARQ process. In such cases, indexing field 310 may be used to convey additional bits of a new data indicator. In some cases, the bits in indexing field 310 may be appended to the bits of NDI field 305, yielding a multi-bit new data indicator. In some cases, indexing field 310 may have a length of two bits. In other cases, indexing field 310 may be used to convey all of the bits of the new data indicator and the new data indication in NDI field 305 may be ignored.

Power control field 315 may be used to indicate a power level for transmitting HARQ-ACK feedback to a base station. Power control field 315 may include a TPC command that indicates a power level of the uplink transmission relative to a power level used for a previous transmission. Similar to indexing field 310, power control field 315 may be unused when HARQ-ACK reporting has been disabled for a corresponding HARQ process. In addition, or in the alternative, to using indexing field 310, power control field 315 may be used convey at least a portion, or all of, the new data indicator.

Resource indication field 320 may be used to indicate uplink communication resource for transmitting HARQ-ACK feedback. Resource indication field 320 may include a data resource to uplink control resource (PDSCH to PUCCH resource) indicator field that indicates a time and frequency location of the uplink control resources relative to the data resources. Additionally, or alternatively, resource indication field 320 may include a data resource to acknowledgment resource (e.g., PDSCH to HARQ-ACK resource) indicator field that indicates a time and frequency location of HARQ-ACK resources relative to the data resources. Similar to indexing field 310 and power control field 315, resource indication field 320 may be unused when HARQ-ACK reporting has been disabled for a corresponding HARQ process. In addition, or in the alternative, to using indexing field 310 and/or power control field, resource indication field 320 may be used to convey at least a portion, or all, of the new data indicator.

Padding field 330 may be used to ensure that a size of control message 300 when used to transmit uplink control information corresponds to a size of control message 3300 when used to transmit downlink control information. In addition, or in the alternative, to using any combination of indexing field 310, power control field, 315, and resource indication field 320, padding field 330 may be used to convey at least a portion, or all, of the new data indicator.

Coding field 325 may be used to indicate a redundancy version used for a scheduled transmission. Coding field 325 may include an RVID field that indicates a redundancy version used for the scheduled transmission. In some cases, a value of coding field 325 may be changed for each subsequent transmission in accordance with a redundancy version sequence. In some cases, a value of coding field 325 may be set to a particular value (e.g., a value that corresponds to RV0) whenever a transmission for corresponding HARQ process includes new data. As discussed herein, the value of coding field 325 may be used in combination with a value of NDI field 305 to determine whether a transmission scheduled for a corresponding HARQ process includes new data.

Figure 4:
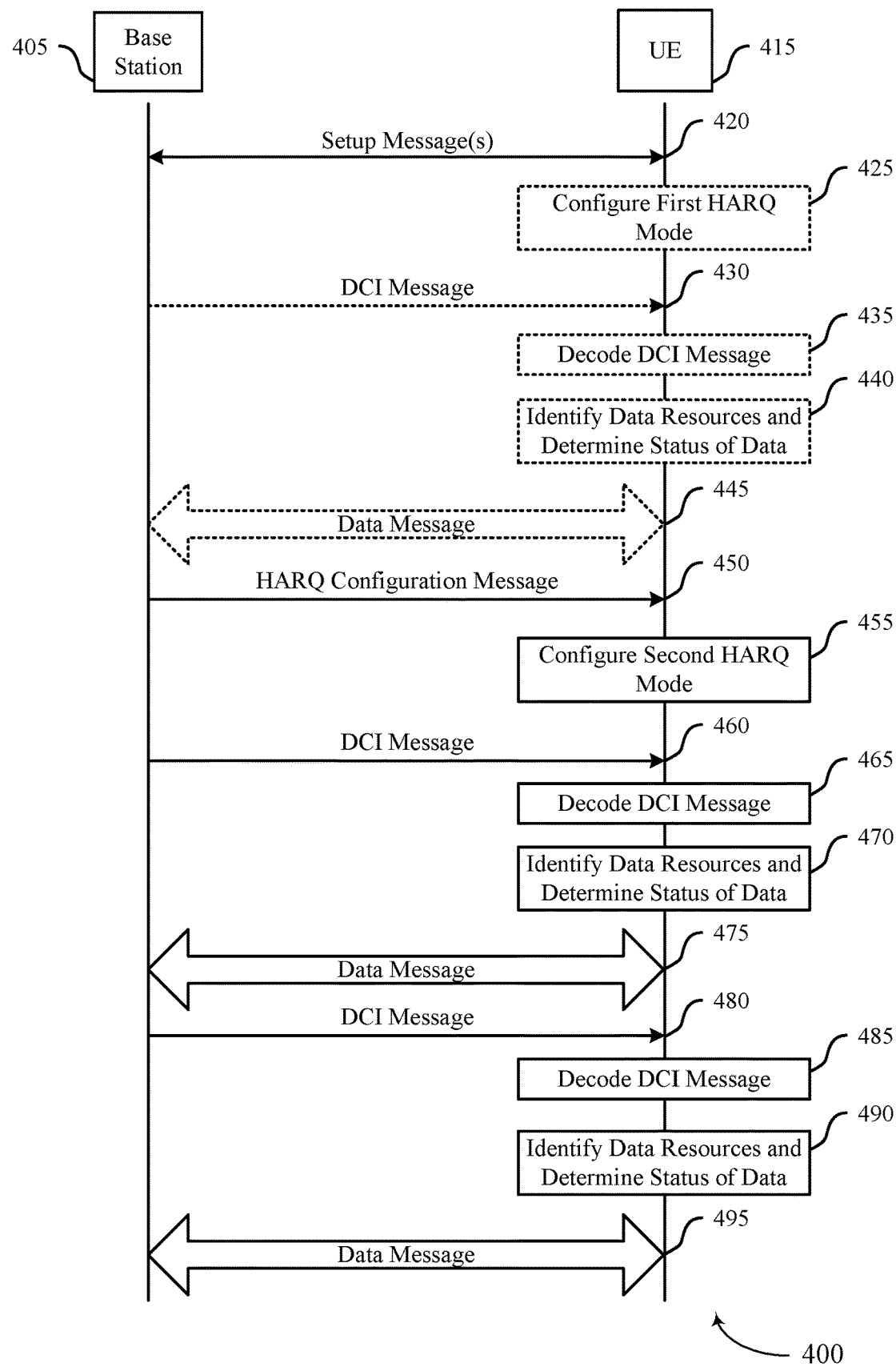
FIG. 4 illustrates an example of a process flow that supports indicating original data communications in accordance with one or more aspects of the present disclosure.

FIG. 4 illustrates aspects of a process for indicating original data communications in accordance with various aspects of the present disclosure. Process flow 400 may be performed by base station 405 and UE 415, which may be examples of a base station or UE described above with reference to FIGS. 1 through 3.

In some examples, process flow 400 illustrates an example sequence of operations performed during a procedure that uses enhanced techniques for indicating and/or determining that a downlink or uplink data transmission is scheduled to include new data. One skilled in the art would understand that one or more of the operations described in process flow 400 may be performed earlier or later in the process, omitted, and/or replaced. Also, additional operations described herein that are not included in process flow 400 may be included.

At 420, base station 405 and UE 415 may exchange control signaling (e.g., RRC signaling). In some cases, base station 405 may send control signaling to UE 415 indicating a number of HARQ processes that are supported for transmissions between base station 405 and UE 415. In some examples, base station 405 and/or UE 415 signals a capability to support enhanced techniques for indicating and/or determining that a data transmission is scheduled to include new data.

Base station 405 may send control signaling indicating whether an NDI field includes one or multiple bits to UE 415. Base station 405 may send control signaling indicating that control fields used to support HARQ-ACK reporting may be also be used to convey a new data indication to UE 415. Base station 405 may send control signaling indicating a redundancy version sequence to UE 415. Base station 405 may send control signaling indicating a maximum number of times a redundancy version may be repeated in a redundancy version sequence to UE 415. Base station 405 may send control signaling indicating a redundancy version associated with new data to UE 415. Base station 405 may send control signaling indicating a timing parameter that indicates a maximum duration between transmissions of new and repeated data.

In some cases, base station 405 may send a configuration message to UE 415 that disables HARQ-ACK reporting for at least one of the HARQ processes used for communicating data between base station 405 and UE 415. In some cases, base station 405 may send a configuration message to UE 415 that enables HARQ-ACK reporting for at least one of the HARQ processes used for communicating data between base station 405 and UE 415. In some cases, base station 405 sends a configuration message that configures a mode for processing (e.g., decoding) a downlink control message in accordance with a first set of techniques for indicating and/or determining that a data transmission is scheduled to include new data when HARQ-ACK reporting is enabled. And the enhanced techniques for indicating and/or determining that a data transmission is scheduled to include new data when HARQ-ACK reporting is disabled.

At 425, UE 415 may configure one or more HARQ modes for one or more HARQ processes based at least in part on the exchanged control signaling. In some examples, UE 415 may configure a mode for a HARQ process that enables HARQ-ACK reporting for the HARQ process. In some cases, UE 415 may determine that a first control message format that includes an NDI field having a length of one bit is used to transmit control messages based on HARQ-ACK reporting being enabled. In other cases, UE 415 may determine that a control message format that includes an NDI field having a length of multiple bits is used to transmit control messages based on receiving corresponding control signaling even though HARQ-ACK reporting is enabled.

At 430, base station 405 may transmit a DCI message to UE 415 in accordance with a format that includes an NDI field having a single bit. The DCI message may also include HARQ-ACK fields that are used to support the transmission of a HARQ-ACK report from UE 415. The DCI message may also include an RVID field that indicates that a downlink or uplink transmission scheduled by the control message was generated in accordance with an indicated redundancy version. In some cases, the DCI message includes a downlink grant scheduling a downlink data transmission. In other cases, the DCI message includes an uplink grant scheduling an uplink data transmission.

At 435, UE 415 may decode a portion of the DCI message associated with the HARQ process for which HARQ-ACK reporting is enabled in accordance with the determined control message format—e.g., in accordance with the control message format that includes an NDI field having a single bit. In other examples, the UE may decode the portion of the DCI message associated with the HARQ process for which HARQ-ACK reporting is enabled in accordance with the control message format that includes an NDI field having multiple bits. UE 415 may also decode the remaining portions of the DCI message associated with the remaining HARQ processes for which HARQ-ACK reporting is enabled or disabled.

At 440, UE 415 may identify data resources allocated for a data transmission scheduled by the control message. UE 415 may also determine a status of data to include in the data transmission. That is, UE 415 may determine whether to include original/new data or repeated data in the data transmission based on a value of the NDI field of the received control message. In some cases, UE 415 may determine that new data is to be transmitted based on determining that a value of the NDI field is different than a value of an NDI field included in a preceding DCI message received at UE 415. In other cases, UE 415 may determine that repeated data is to be transmitted based on determining that a value of the NDI field is different than a value of an NDI field included in a preceding DCI message received at UE 415.

At 445, UE 415 may receive a downlink data message from base station 405 in the indicated data resources—e.g., if DCI message includes a downlink grant. In some examples, UE 415 may decode the data as new data based on the status of the data being determined as new. In other examples, UE 415 may decode the data as repeated data (e.g., using combining techniques), based on the status of the data being determined as repeated. In both cases, UE 415 may decode the received data in accordance with a redundancy version indicated by the DCI message.

Alternatively, UE 415 may transmit an uplink data message to base station 405 in the indicated data resources—e.g., if DCI message includes an uplink grant. In some examples, UE 415 may generate the uplink data message to include new data based on the status of the data being determined as new. In other examples, UE 415 may generate the uplink data message to include repeated data based on the status of the data being determined as repeated. In both cases, UE 415 may generate the data message in accordance with a redundancy version indicated by the DCI message.

At 450, UE 415 may receive a HARQ configuration message from base station 405. In some cases, UE 415 may receive the HARQ configuration message concurrently with the setup messages signaled at 420—e.g., and the operations described at 425 to 445 may be omitted.

At 455, UE 415 may configure one or more HARQ modes for one or more HARQ processes based at least in part on the received HARQ configuration message. In some examples, UE 415 may configure a mode for a HARQ process that disables HARQ-ACK reporting for the HARQ process for which HARQ-ACK reporting was previously enabled. In some cases, UE 415 may determine that a first control message format that includes an NDI field having a length of multiple bits is used to transmit control messages based on HARQ-ACK reporting being disabled. Additionally, or alternatively, UE 415 may determine that a first control message format that includes an NDI field having a length of a single bit is used to transmit control messages and that other fields of the control message are used to convey a new data indicator, in combination with or separate from the NDI field, based on HARQ-ACK reporting being disabled. Additionally, or alternatively, UE 415 may determine that a first control message format that includes an NDI field having a length of a single bit is used to transmit control messages and that an RVID field is used to supplement the determination of whether new data is scheduled to be transmitted in a data transmission based on HARQ-ACK reporting being disabled.

At 460, UE 415 may receive a control message from base station 405. The control message may include an NDI field having multiple bits. Or the control message may include an NDI field having a single bit. The control message may also include one or more HARQ-ACK fields that support HARQ-ACK reporting for the disabled HARQ process. The control message may also include one or more padding fields, including a padding field for the disabled HARQ process. The control message may also include an RVID field for the disabled HARQ process. The control message may also include additional NDI, HARQ-ACK, padding, and/or RVID fields for other enabled and/or disabled HARQ processes.

At 465, UE 415 may decode a portion of the DCI message associated with the disabled HARQ process based on a configured mode and/or predetermined rules for determining whether a scheduled data transmission includes new data. In some examples, UE 415 decodes the portion of the DCI message associated with the disabled HARQ process based on determining that the NDI field includes multiple bits. In some examples, UE 415 decode the portion of the DCI message associated with the disabled HARQ process based on determining that one or more HARQ-ACK fields (e.g., indexing field 310 of FIG. 3, power control field 315 of FIG. 3, resource indication field 320 of FIG. 3, or any combination thereof) are being used to convey all or a portion of the new data indicator, where the NDI field may include a single bit. In some examples, UE 415 may determine a value of the new data indicator based on combining the bit included in the NDI field with one or more bits included in a HARQ-ACK field. In some examples, UE 415 decodes the portion of the DCI message associated with the disabled HARQ process based on determining that a padding field is being used to convey all or a portion of the new data indicator, where the NDI field may include a single bit.

At 470, UE 415 may identify data resources scheduled by the DCI message for a downlink or uplink data transmission. UE 415 may also determine a status of data to be included in the downlink or uplink data transmission as new or repeated. In some cases, UE 415 may determine whether the downlink or uplink data transmission is scheduled to include new data based on a value of the new data indicator signaled in the DCI message. In some cases, UE 415 may also determine whether the downlink or uplink data transmission is scheduled to include new data based on a value of an RVID field. In some examples, UE 415 determines that the downlink or uplink data transmission is scheduled to include new data based on a redundancy version that is associated with new data (e.g., RV0) being indicated by the RVID field.

At 475, UE 415 may receive a downlink data transmission from base station 405 based on the DCI message scheduling downlink data resources. UE 415 may determine that the downlink transmission includes new data based on the determined status of the data.

Alternatively, UE 415 may transmit an uplink data transmission to base station 405 based on the DCI message scheduling uplink data resources. UE 415 may determine that the new data is to be included in the uplink data based on the determined status of the data.

At 480, UE 415 may receive another downlink control message from base station 405, as similarly described with reference to 460.

At 485, UE 415 may decode the downlink control message to determine a value of a single or multi-bit NDI field and a value of an RVID field, as similarly described with reference to 465.

At 490, UE 415 may identify data resources schedule by the DCI message for an uplink or downlink data transmission. UE 415 may also determine whether the downlink or uplink data transmission is scheduled to include new data based on a value of the new data indicator signaled in the DCI message compared with a value of the new data indicator signaled in the DCI message transmitted at 460. In some cases, UE 415 may also determine whether the downlink or uplink data transmission is scheduled to include new data based on a value of an RVID field with a value of the RVID field signaled in the DCI message transmitted at 460.

In some examples, UE 415 may determine that new data is scheduled to be transmitted in the data transmission based on determining that a value of the new data indicator signaled in the DCI message (e.g., obtained from one or more fields of the DCI message) is different than the value of the new data indicator signaled in the preceding DCI message.

In other examples, UE 415 may determine that a value of the new data indicator signaled in the DCI message is the same as the value of the new data indicator signaled in the preceding DCI message. In such cases, before determining that repeated data is scheduled for the data transmission, UE 415 may compare a value of an RVID field included in the DCI message with a value of the RVID field included in the preceding DCI message. UE 415 may determine that new data is scheduled for the data transmission based on determining that a value of the RVID field in the DCI message is the same as the value of the RVID field in the preceding DCI message. Alternatively, before determining that repeated data is scheduled for the data transmission, UE 415 may determine whether the value of the RVID field included in the DCI message corresponds to a redundancy version associated with new data. UE 415 may determine that new data is scheduled for the data transmission based on determining that a value of the RVID field in the DCI message correspond to the redundancy version associated with new data.

Alternatively, before determining that repeated data is scheduled for the data transmission, UE 415 may determine whether the data transmission scheduled by the DCI message and the data transmission scheduled by the preceding DCI message are separated by a duration (e.g., measured in slots or milliseconds) that exceeds a timing threshold. UE 415 may determine that new data is scheduled for the data transmission based on determining that a duration, or number of slots, between the control message and the preceding control message exceeds a timing threshold. In some cases, UE 415 may determine that new data is scheduled for the data transmission based on determining that a duration, or number of slots, between the data message scheduled by the control message and the preceding data message scheduled by the control message exceeds a timing threshold.

At 495, UE 415 may transmit or receive a data transmission that includes new data or repeated data based on a result of determining whether new data is scheduled for the data transmission.

Figure 5:
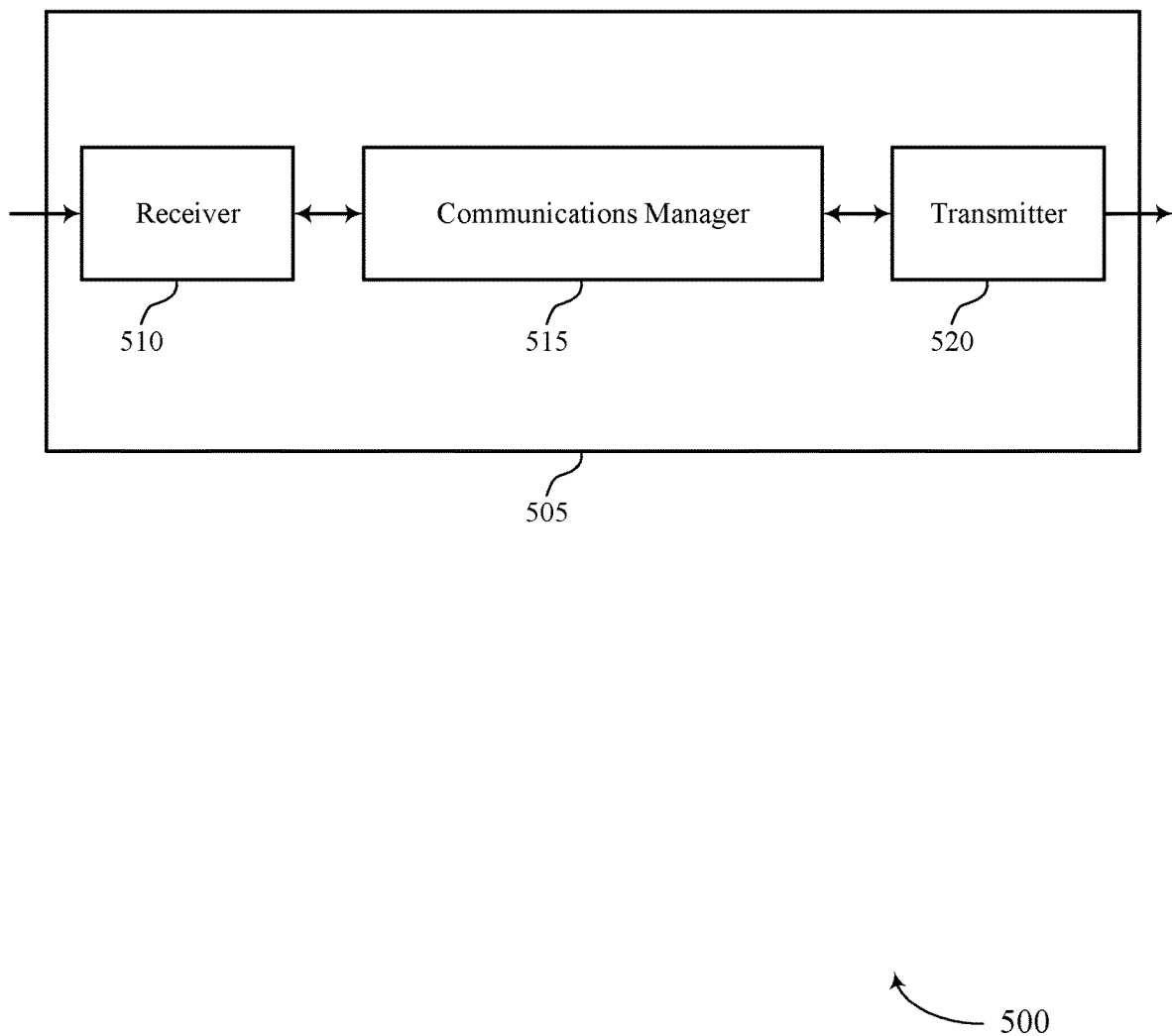
FIGS. 5 and 6 show block diagrams of devices that support indicating original data communications in accordance with one or more aspects of the present disclosure.

FIG. 5 shows a block diagram 500 of a device 505 that supports indicating original data communications in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to indicating original data communications, etc.). Information may be passed on to other components of the device 505. The receiver 510 may be an example of aspects of the transceiver 820 described with reference to FIG. 8. The receiver 510 may utilize a single antenna or a set of antennas.

As described herein, the communications manager 515 may receive a first control message including a first indication that one of original data or repeated data is to be included in a first data transmission scheduled by the first control message, the first indication having a single bit, receive, based on the mode being configured for the UE, a second control message including a second indication that one of original data or repeated data is to be included in a second data transmission scheduled by the second control message, the second indication having a set of bits (e.g., a plurality of bits), receive a configuration message configuring a mode that disables acknowledgment feedback reporting for the UE, and communicate the second data transmission based on the second indication.

As also described herein, the communications manager 515 may also receive a configuration message configuring a mode that disables acknowledgment feedback reporting for the UE, receive a first control message including a first indication that original data is to be included in a first data transmission scheduled by the first control message, the first data transmission being associated with a HARQ process, receive, after the first control message, a second control message including a second indication that repeated data is to be included in a second data transmission scheduled by the second control message, the second control message being associated with the HARQ process, and communicate, based on the mode being configured for the UE, an original set of data in the second data transmission based on a timing threshold associated with receiving the first control message being exceeded. The communications manager 515 may be an example of aspects of the communications manager 810 described herein.

The communications manager 515 may be an example of means for performing various aspects of managing data communications as described herein. The communications manager 515, or its sub-components, may be implemented in hardware (e.g., in communications management circuitry). The circuitry may be comprised of a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

In some examples, the communications manager 515 may be configured to perform various operations (e.g., receiving, determining, transmitting) using or otherwise in cooperation with the receiver 510, the transmitter 520, or both.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
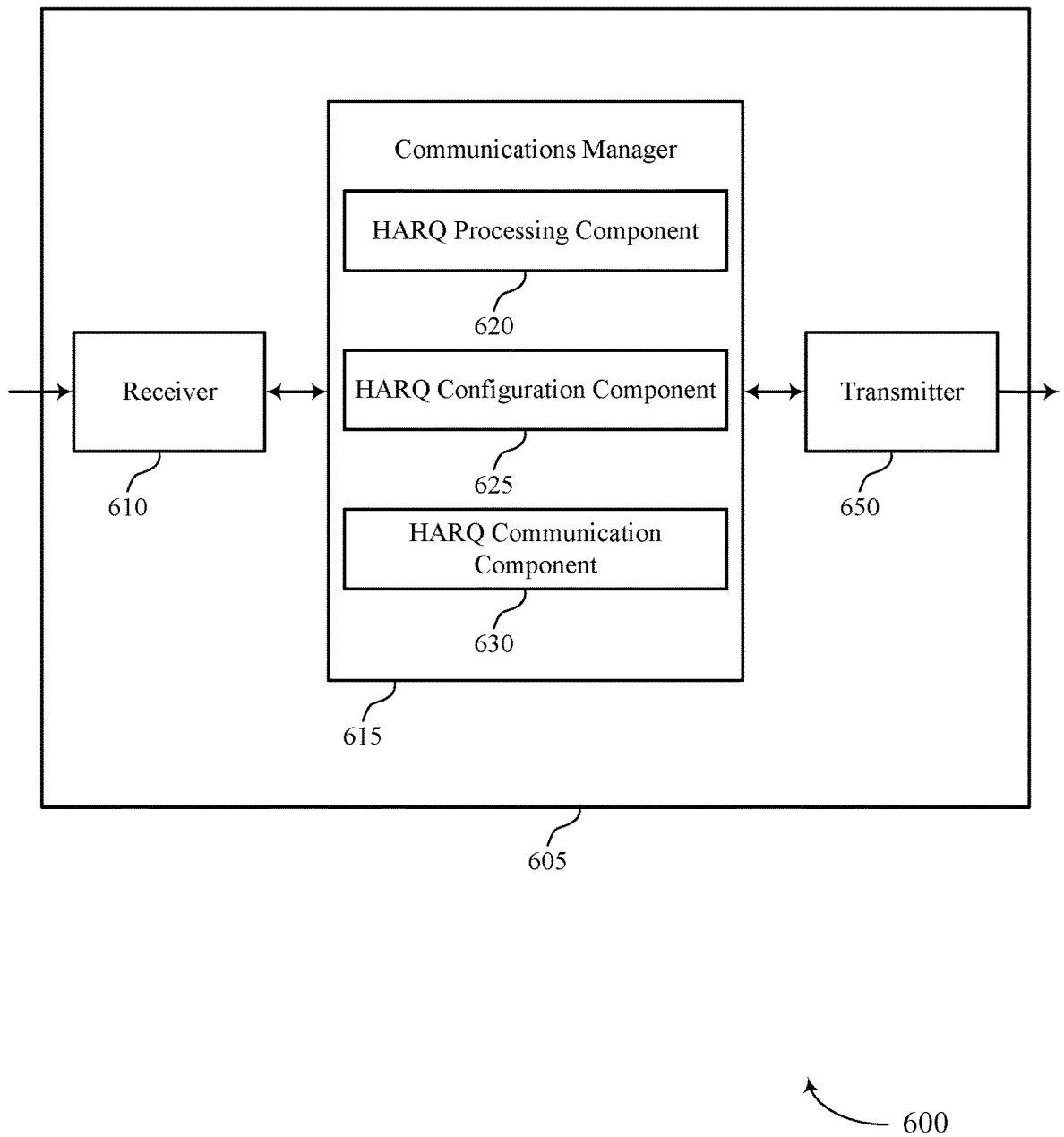

FIG. 6 shows a block diagram 600 of a device 605 that supports indicating original data communications in accordance with one or more aspects of the present disclosure. The device 605 may be an example of aspects of a device 505, or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to indicating original data communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a HARQ processing component 620, a HARQ configuration component 625, and a HARQ communication component 630. The communications manager 615 may be an example of aspects of the communications manager 810 described herein.

In some examples, the HARQ processing component 620 may receive a first control message including a first indication that one of original data or repeated data is to be included in a first data transmission scheduled by the first control message, the first indication having a single bit and receive, based on the mode being configured for the UE, a second control message including a second indication that one of original data or repeated data is to be included in a second data transmission scheduled by the second control message, the second indication having a plurality of bits (e.g., two or more bits). The HARQ configuration component 625 may receive a configuration message configuring a mode that disables acknowledgment feedback reporting for the UE. And the HARQ communication component 630 may communicate the second data transmission based on the second indication.

In some examples, the HARQ configuration component 625 may receive a configuration message configuring a mode that disables acknowledgment feedback reporting for the UE. The HARQ processing component 620 may receive a first control message including a first indication that original data is to be included in a first data transmission scheduled by the first control message, the first data transmission being associated with a HARQ process and receive, after the first control message, a second control message including a second indication that repeated data is to be included in a second data transmission scheduled by the second control message, the second control message being associated with the HARQ process. And the HARQ communication component 630 may communicate, based on the mode being configured for the UE, an original set of data in the second data transmission based on a timing threshold associated with receiving the first control message being exceeded.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
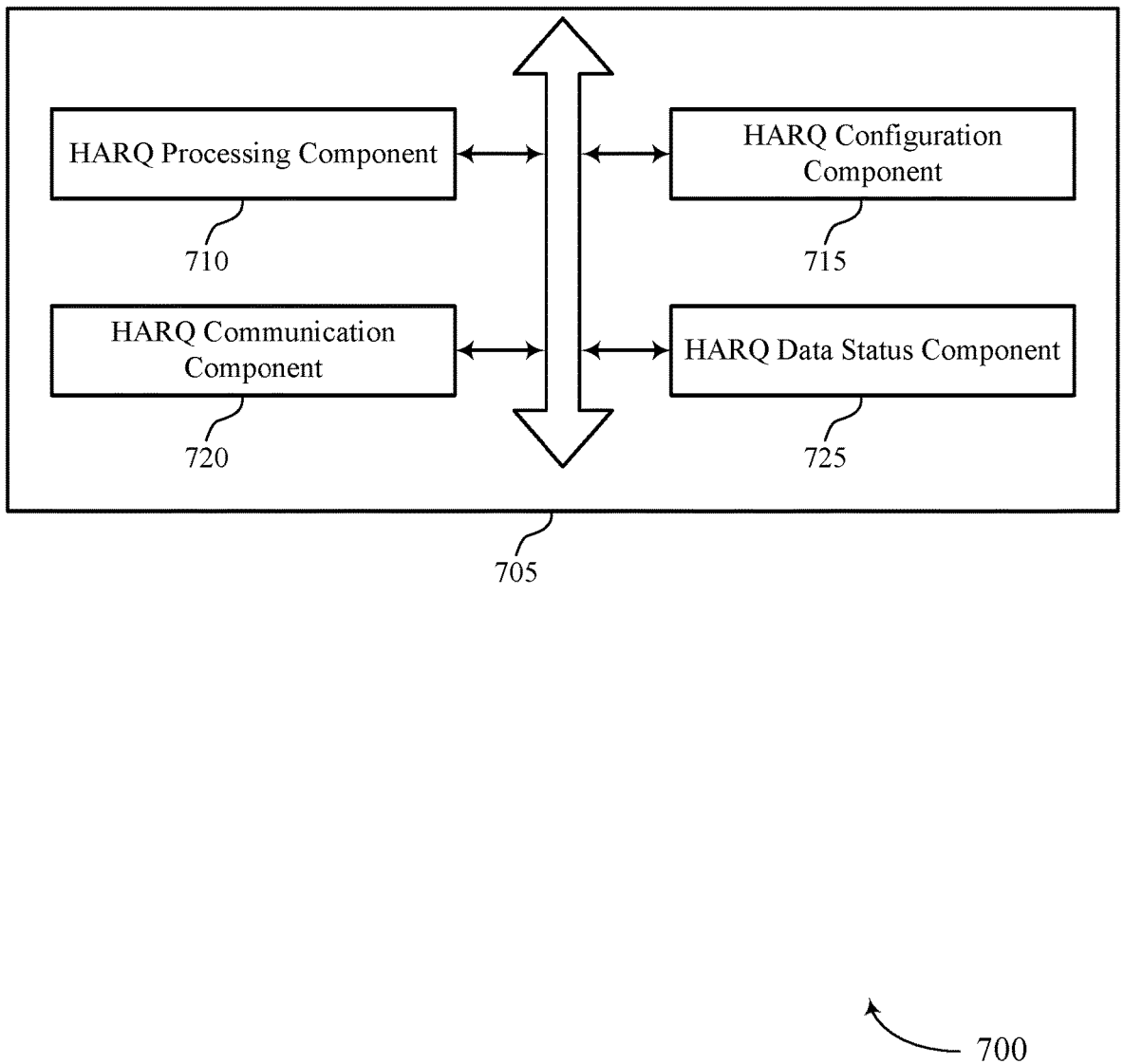
FIG. 7 shows a block diagram of a communications manager that supports indicating original data communications in accordance with one or more aspects of the present disclosure.

FIG. 7 shows a block diagram 700 of a communications manager 705 that supports indicating original data communications in accordance with one or more aspects of the present disclosure. The communications manager 705 may be an example of aspects of a communications manager 515, a communications manager 615, or a communications manager 810 described herein. The communications manager 705 may include a HARQ processing component 710, a HARQ configuration component 715, a HARQ communication component 720, and a HARQ data status component 725. Each of these modules may communicate, directly or indirectly, with one another (e.g., via one or more buses).

The HARQ processing component 710 may receive a first control message including a first indication that one of original data or repeated data is to be included in a first data transmission scheduled by the first control message, the first indication having a single bit.

In some examples, the HARQ processing component 710 may receive, based on the mode being configured for the UE, a second control message including a second indication that one of original data or repeated data is to be included in a second data transmission scheduled by the second control message, the second indication having a plurality of bits (e.g., two or more bits).

In some examples, the HARQ processing component 710 may receive control signaling indicating that the second indication includes the plurality of bits based on the mode that disables acknowledgment feedback reporting being configured for the UE.

In some examples, the HARQ processing component 710 may determine that a first field for indicating original data transmission or repeated data transmission has a first length that spans one bit based on a second mode that enables acknowledgement feedback reporting being configured for the UE, where the first control message includes the first field.

In some examples, the HARQ processing component 710 may determine that the first field has a second length that spans multiple bits based on the mode that disables acknowledgment feedback reporting being configured for the UE, where the second control message includes the first field.

In some examples, the HARQ processing component 710 may receive, based on the mode that disables acknowledgment feedback reporting being configured for the UE, a third control message including a third indication that one of original data or repeated data is to be included in a third data transmission scheduled by the third control message.

In some examples, the HARQ processing component 710 may determine that a second field for supporting acknowledgment feedback reporting is alternatively configured to indicate original data transmission or repeated data transmission based on the mode that disables acknowledgment feedback reporting being configured for the UE, where the second control message includes the first field and the second field.

In some examples, the HARQ processing component 710 may receive, based on the mode that disables acknowledgment feedback reporting being configured for the UE, a third control message including a third indication that one of original data or repeated data is to be included in a third data transmission scheduled by the third control message.

In some examples, the HARQ processing component 710 may determine that a second field for padding is alternatively configured to indicate original data transmission or repeated data transmission based on the mode that disables acknowledgment feedback reporting being configured for the UE, where the second control message includes the first field and the second field, the first field of the second control message includes a first portion of the second indication, and the second field of the second control message includes a second portion of the second indication.

In some examples, the HARQ processing component 710 may determine that a second field for indicating redundancy versions is further configured to indicate original data transmission or repeated data transmission based on the mode that disables acknowledgment feedback reporting being configured for the UE, where the second control message includes the first field and the second field.

In some examples, the HARQ processing component 710 may receive, based on the mode that disables acknowledgment feedback reporting being configured for the UE, a third control message including a fourth indication that one of original data or repeated data is to be included in a third data transmission scheduled by the third control message and a fifth indication that the third data transmission is scheduled to use one of the set of redundancy versions, where the second control message includes a third indication that the second data transmission is scheduled to use one of a set of redundancy versions.

In some examples, the HARQ processing component 710 may decode the second control message based on the mode that disables acknowledgment feedback reporting being configured for the UE.

In some cases, the first control message is received based on the first length of the first field, the first field of the first control message including the first indication. In some cases, the second control message is received based on the second length of the first field, the first field of the second control message including the second indication.

In some cases, the first field includes a first portion of the second indication and the second field includes a second portion of the second indication. In some cases, the second field is associated with a disabled hybrid automatic repeat request process. In some cases, the first field includes a first portion of the second indication. In some cases, the second field includes a second portion of the second indication.

The HARQ configuration component 715 may receive a configuration message configuring a mode that disables acknowledgment feedback reporting for the UE. In some examples, the HARQ configuration component 715 may disable acknowledgement feedback reporting for a first HARQ process of a set of HARQ processes configured for the UE based on the configuration message, the second indication being associated with the first HARQ process, where acknowledgment feedback reporting remains enabled for a second HARQ process of the set of HARQ processes based on the configuration message.

The HARQ communication component 720 may communicate the second data transmission based on the second indication. In some examples, the HARQ communication component 720 may identify that a downlink transmission is scheduled by the second control message includes a downlink data transmission based on the second control message. In some examples, the HARQ communication component 720 may receive, from a base station, the original set of data in the downlink data transmission, the original set of data being transmitted by the base station for an initial time in the downlink data transmission.

In some examples, the HARQ communication component 720 may receive, from a base station, the repeated set of data in the downlink data transmission, the repeated set of data being previously transmitted in a prior downlink data transmission. In some examples, the HARQ communication component 720 may identify that an uplink data transmission is scheduled by the second control message based on the second control message. In some examples, the HARQ communication component 720 may generate the uplink data transmission including the original set of data based on the second indication.

In some examples, the HARQ communication component 720 may transmit, to a base station, the original set of data in the uplink data transmission, the original set of data being transmitted by the UE for an initial time in the uplink data transmission. In some examples, the HARQ communication component 720 may generate the uplink data transmission including the repeated set of data based on the second indication. In some examples, the HARQ communication component 720 may transmit, to a base station, the repeated set of data in the uplink data transmission, the repeated set of data being previously transmitted by the UE in a prior uplink data transmission.

The HARQ data status component 725 may determine that the third data transmission includes an original set of data based on the third indication and the second indication. In some examples, HARQ data status component 725 may compare the third indication of the third control message with the second indication of the second control message, where the determining that the third data transmission includes the original set of data is based on a second value of the second indication being different than a third value of the third indication. In some examples, HARQ data status component 725 may determine that the third data transmission includes an original set of data based on the second indication and the third indication. In some examples, HARQ data status component 725 may determine that the third data transmission includes an original set of data based on the second indication, the third indication, the fourth indication, and the fifth indication.

In some examples, HARQ data status component 725 may compare the fourth indication of the third control message with the second indication of the second control message and the fifth indication of the third control message with the third indication of the second control message, where the determining that the third data transmission includes the original set of data is based on a fourth value of the fourth indication being equal to a second value of the second indication.

In some examples, HARQ data status component 725 may receive control signaling including a sequence of the set of redundancy versions, the sequence including a first amount of repetitions of each of the set of redundancy versions, where determining that the third data transmission includes the original set of data is based on the fifth indication of the third control message indicating a second amount of repetitions for a redundancy version in the sequence that is greater than the first amount of repetitions. In some examples, the HARQ data status component 725 may identify that the downlink data transmission includes an original set of data based on the second indication included in the second control message. In some examples, the HARQ data status component 725 may identify that the downlink data transmission includes a repeated set of data based on the second indication included in the second control message. In some examples, the HARQ data status component 725 may identify that the uplink data transmission includes an original set of data based on the second indication included in the second control message.

In some examples, the HARQ data status component 725 may identify that the uplink data transmission includes a repeated set of data based on the second indication included in the second control message. In some examples, the HARQ data status component 725 may compare the third indication of the third control message with the second indication of the second control message, where the determining that the third data transmission includes the original set of data is based on a second value of the second indication being different than a third value of the third indication. In some cases, the determining that the third data transmission includes the original set of data is based on a fifth value of the fifth indication of the third control message being equal to a third value of the third indication of the second control message. In some cases, the determining that the third data transmission includes the original set of data is based on the fifth indication of the third control message indicating a redundancy version of the set of redundancy versions that is associated with original data.

The HARQ configuration component 715 may receive a configuration message configuring a mode that disables acknowledgment feedback reporting for the UE. In some examples, the HARQ configuration component 715 may receive, from a base station, the original set of data in the downlink data transmission based on the quantity of slots located between the first slot and the second slot exceeding the threshold quantity of slots, the original set of data being transmitted by the base station for an initial time in the downlink data transmission.

The HARQ processing component 710 may receive a first control message including a first indication that original data is to be included in a first data transmission scheduled by the first control message, the first data transmission being associated with a HARQ process. In some examples, the HARQ processing component 710 may receive, after the first control message, a second control message including a second indication that repeated data is to be included in a second data transmission scheduled by the second control message, the second control message being associated with the HARQ process.

In some examples, the HARQ processing component 710 may decode the second control message based on the mode that disables acknowledgment feedback reporting being configured for the UE. In some examples, the HARQ processing component 710 may decode the second control message based on the mode that disables acknowledgment feedback reporting being configured for the UE. In some examples, the HARQ processing component 710 may identify first data resources in the first data transmission scheduled by the first control message in a first slot. In some examples, the HARQ processing component 710 may identify second data resources in the second data transmission scheduled by the second control message in a second slot.

The HARQ communication component 720 may communicate, based on the mode being configured for the UE, an original set of data in the second data transmission based on a timing threshold associated with receiving the first control message being exceeded. In some examples, the HARQ communication component 720 may identify that a downlink data transmission is scheduled by the second control message based on the second control message. In some examples, the HARQ communication component 720 may identify that an uplink data transmission is scheduled by the second control message based on the second control message. In some examples, the HARQ communication component 720 may generate the uplink data transmission including the original set of data based on the identifying. In some examples, the HARQ communication component 720 may transmit, to a base station, the original set of data in the uplink data transmission based on the quantity of slots located between the first slot and the second slot exceeding the threshold quantity of slots, the original set of data being transmitted by the UE for an initial time in the uplink data transmission.

In some examples, the HARQ communication component 720 may receive a first data message scheduled by the first control message. In some examples, the HARQ communication component 720 may receive a second data message scheduled by the second control message. The HARQ data status component 725 may receive an indication of the timing threshold, where the timing threshold is based on a threshold quantity of slots.

In some examples, the HARQ data status component 725 may determine that a quantity of slots located between the first slot and the second slot exceeds the threshold quantity of slots. In some examples, determining that the second data transmission includes the original set of data based on the quantity of slots located between the first slot and the second slot exceeding the threshold quantity of slots.

In some examples, the HARQ data status component 725 may receive an indication of the timing threshold, where the timing threshold is based on a threshold duration. In some examples, the HARQ data status component 725 may initiate a timer based on receiving the first control message. In some examples, the HARQ data status component 725 may determine that a value of the timer when the second control message is received exceeds the threshold duration.

In some examples, HARQ data status component 725 determines that the second data transmission includes the original set of data based on the value of the timer exceeding the threshold duration. In some examples, the HARQ data status component 725 may initiate a timer based on receiving the first data message. In some examples, the HARQ data status component 725 may determine that a value of the timer when the second data message is received exceeds the threshold duration.

Figure 8:
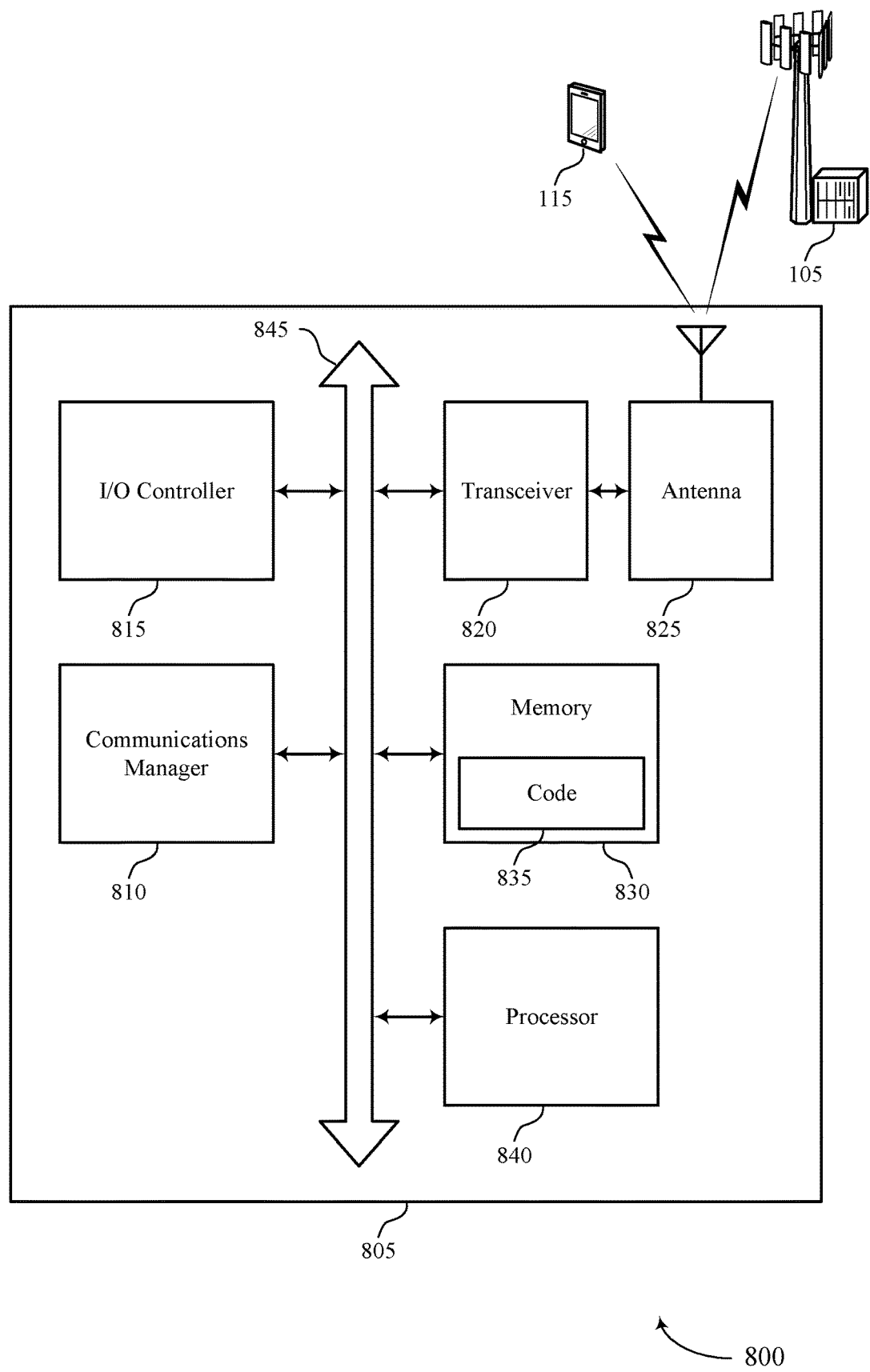
FIG. 8 shows a diagram of a system including a device that supports indicating original data communications in accordance with one or more aspects of the present disclosure.

FIG. 8 shows a diagram of a system 800 including a device 805 that supports indicating original data communications in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a first control message including a first indication that one of original data or repeated data is to be included in a first data transmission scheduled by the first control message, the first indication having a single bit, receive, based on the mode being configured for the UE, a second control message including a second indication that one of original data or repeated data is to be included in a second data transmission scheduled by the second control message, the second indication having a plurality of bits (e.g., two or more bits), receive a configuration message configuring a mode that disables acknowledgment feedback reporting for the UE, and communicate the second data transmission based on the second indication.

The communications manager 810 may also receive a configuration message configuring a mode that disables acknowledgment feedback reporting for the UE, receive a first control message including a first indication that original data is to be included in a first data transmission scheduled by the first control message, the first data transmission being associated with a HARQ process, receive, after the first control message, a second control message including a second indication that repeated data is to be included in a second data transmission scheduled by the second control message, the second control message being associated with the HARQ process, and communicate, based on the mode being configured for the UE, an original set of data in the second data transmission based on a timing threshold associated with receiving the first control message being exceeded.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting indicating original data communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
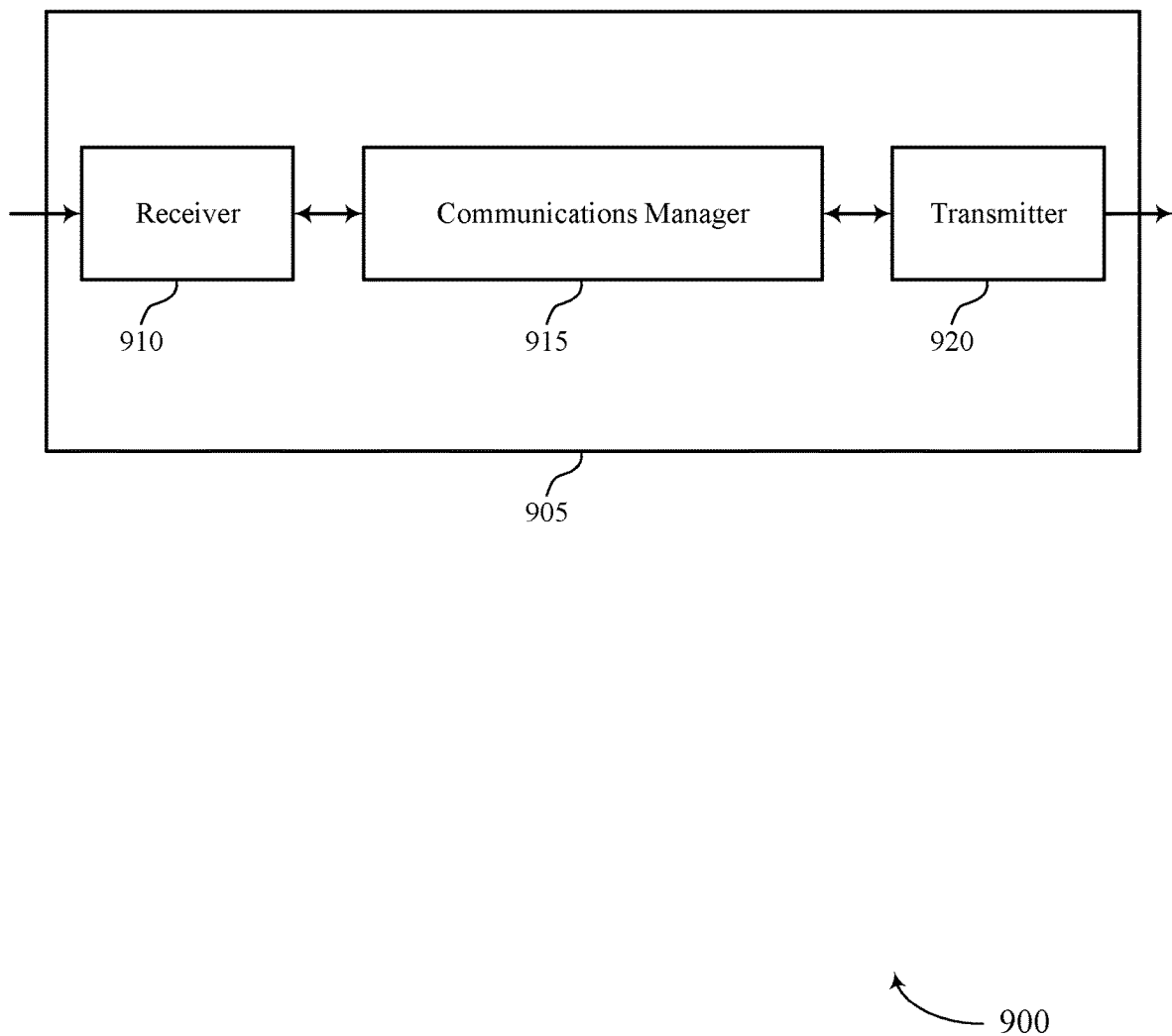
FIGS. 9 and 10 show block diagrams of devices that support indicating original data communications in accordance with one or more aspects of the present disclosure.

FIG. 9 shows a block diagram 900 of a device 905 that supports indicating original data communications in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to indicating original data communications, etc.). Information may be passed on to other components of the device 905. The receiver 910 may be an example of aspects of the transceiver 1220 described with reference to FIG. 12. The receiver 910 may utilize a single antenna or a set of antennas.

As described herein, the communications manager 915 may transmit a first control message including a first indication that one of original data or repeated data is to be included in a first data transmission scheduled by the first control message for a UE, the first indication having a single bit, transmit, based on the mode being configured for the UE, a second control message including a second indication that one of original data or repeated data is to be included in a second data transmission scheduled by the second control message, the second indication having a plurality of bits (e.g., two or more bits), transmit a configuration message configuring a mode that disables acknowledgment feedback reporting for the UE, and communicate the second data transmission based on the second indication.

As also described herein, the communications manager 915 may transmit a configuration message configuring a mode that disables acknowledgment feedback reporting for the UE; transmit a first control message comprising a first indication that original data is to be included in a first data transmission scheduled by the first control message, the first data transmission being associated with a HARQ process; transmit, after the first control message, a second control message comprising a second indication that repeated data is to be included in a second data transmission scheduled by the second control message, the second control message being associated with the HARQ process; and communicate, based at least in part on the mode being configured for the UE, an original set of data in the second data transmission based at least in part on a timing threshold associated with receiving the first control message being exceeded. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915 may be an example of means for performing various aspects of managing data communications as described herein. The communications manager 515, or its sub-components, may be implemented in hardware (e.g., in communications management circuitry). The circuitry may be comprised of a processor, a DSP, an ASIC, an FPGA or other programmable logic device, discrete gate or transistor logic, discrete hardware components, or any combination thereof designed to perform the functions described in the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device.

In some examples, the communications manager 915 may be configured to perform various operations (e.g., receiving, determining, transmitting) using or otherwise in cooperation with the receiver 910, the transmitter 920, or both.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
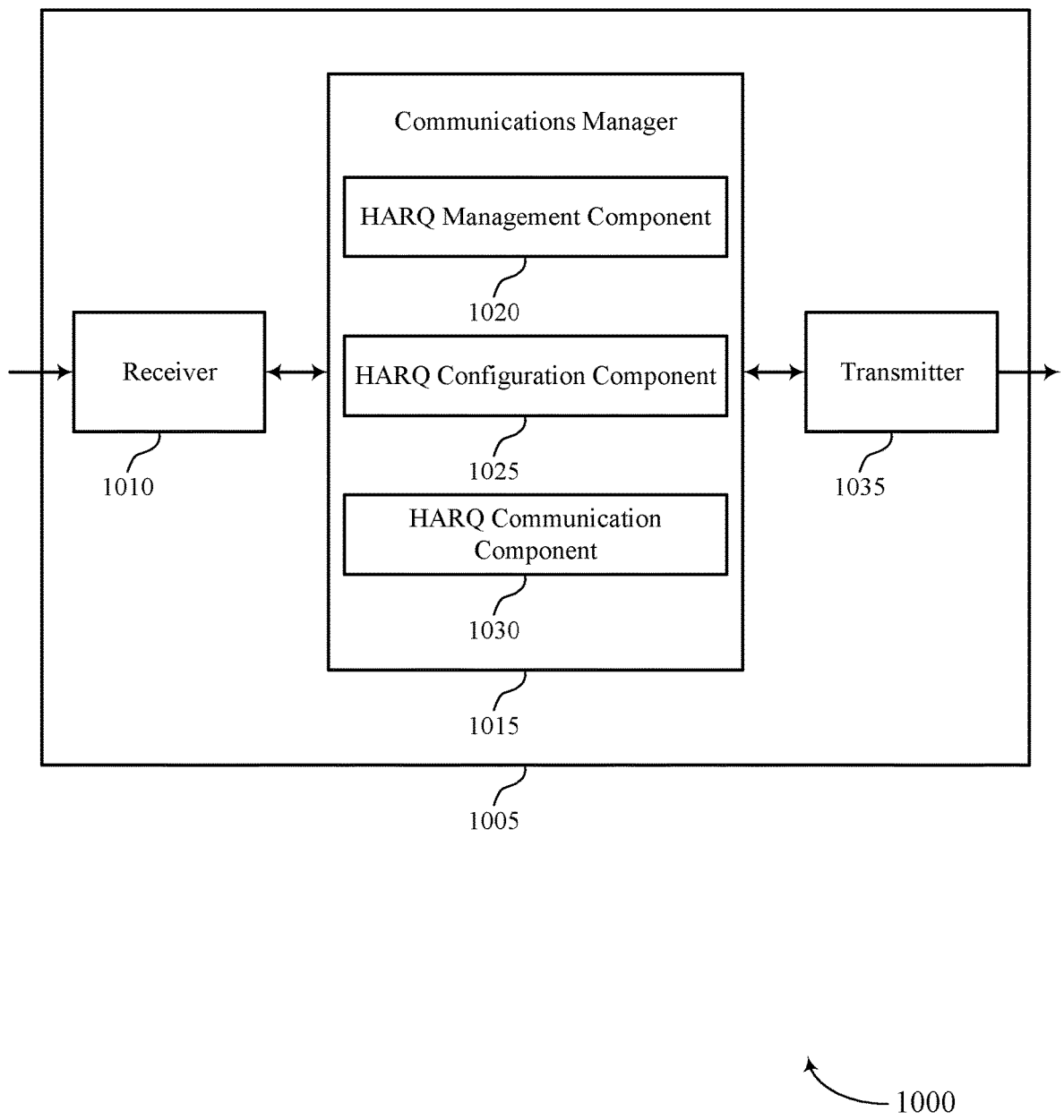

FIG. 10 shows a block diagram 1000 of a device 1005 that supports indicating original data communications in accordance with one or more aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to indicating original data communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a HARQ management component 1020, a HARQ configuration component 1025, and a HARQ communication component 1030. The communications manager 1015 may be an example of aspects of the communications manager 1210 described herein.

As described herein, the HARQ management component 1020 may transmit a first control message including a first indication that one of original data or repeated data is to be included in a first data transmission scheduled by the first control message for a UE, the first indication having a single bit and transmit, based on the mode being configured for the UE, a second control message including a second indication that one of original data or repeated data is to be included in a second data transmission scheduled by the second control message, the second indication having a plurality of bits (e.g., two or more bits). The HARQ configuration component 1025 may transmit a configuration message configuring a mode that disables acknowledgment feedback reporting for the UE. The HARQ communication component 1030 may communicate the second data transmission based on the second indication.

As also described herein, the HARQ configuration component 1025 may transmit a configuration message configuring a mode that disables acknowledgment feedback reporting for the UE. The HARQ management component 1020 may transmit a first control message comprising a first indication that original data is to be included in a first data transmission scheduled by the first control message, the first data transmission being associated with a HARQ process; and transmit, after the first control message, a second control message comprising a second indication that repeated data is to be included in a second data transmission scheduled by the second control message, the second control message being associated with the HARQ process. The HARQ communication component 1030 may communicate, based at least in part on the mode being configured for the UE, an original set of data in the second data transmission based at least in part on a timing threshold associated with the first control message the first control message being exceeded.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
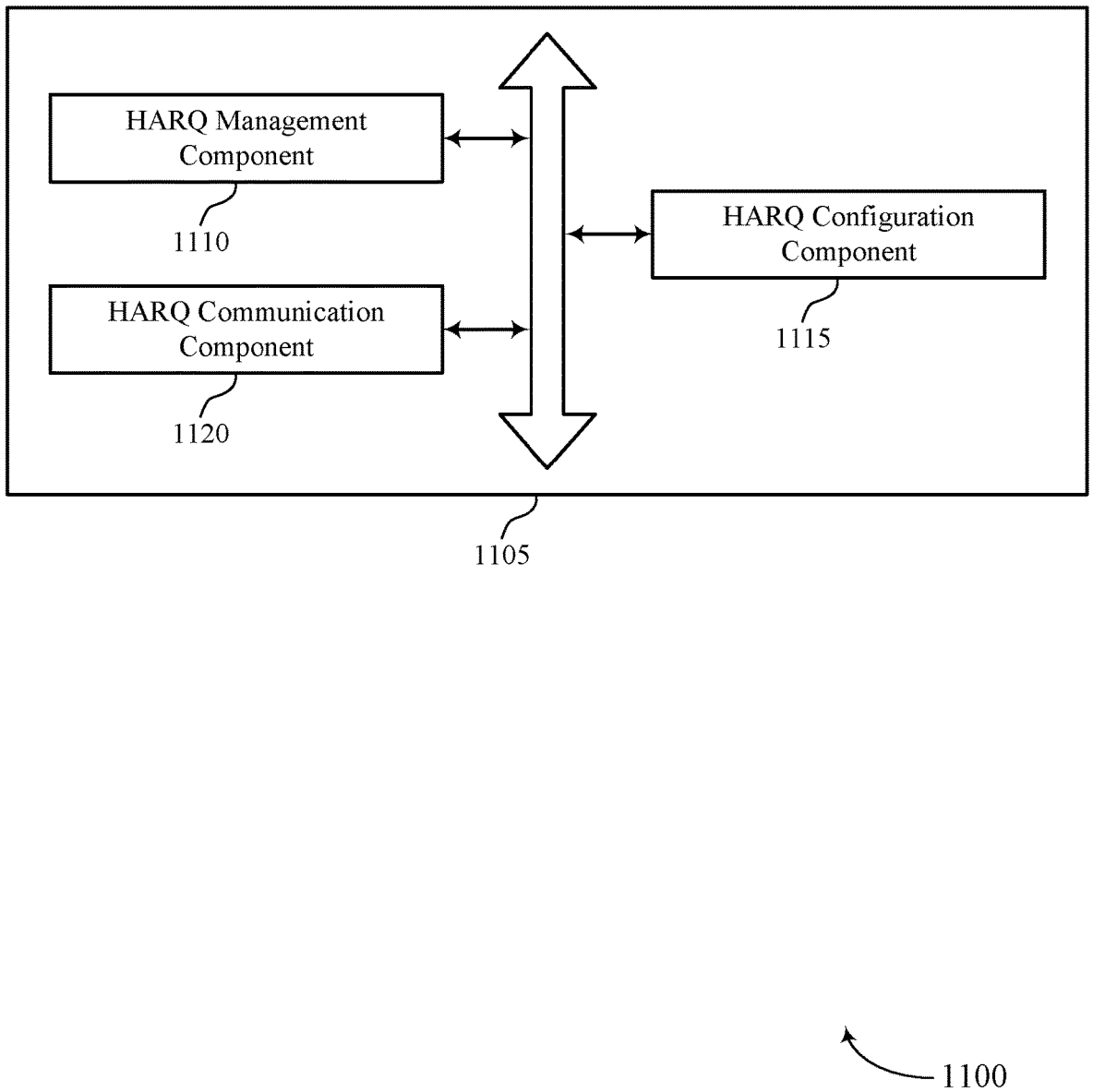
FIG. 11 shows a block diagram of a communications manager that supports indicating original data communications in accordance with one or more aspects of the present disclosure.

FIG. 11 shows a block diagram 1100 of a communications manager 1105 that supports indicating original data communications in accordance with one or more aspects of the present disclosure. The communications manager 1105 may be an example of aspects of a communications manager 915, a communications manager 1015, or a communications manager 1210 described herein. The communications manager 1105 may include a HARQ management component 1110, a HARQ configuration component 1115, and a HARQ communication component 1120. Each of these modules may communicate, directly or indirectly, with one another (e.g., via one or more buses).

As described herein, the HARQ management component 1110 may transmit a first control message including a first indication that one of original data or repeated data is to be included in a first data transmission scheduled by the first control message for a UE, the first indication having a single bit.

In some examples, the HARQ management component 1110 may transmit, based on the mode being configured for the UE, a second control message including a second indication that one of original data or repeated data is to be included in a second data transmission scheduled by the second control message, the second indication having a plurality of bits (e.g., two or more bits).

In some examples, the HARQ management component 1110 may determine that a first field for indicating original data transmission or repeated data transmission has a first length that spans one bit based on a second mode that enables acknowledgement feedback reporting being configured for the UE, where the first control message includes the first field and the first field includes the first indication.

In some examples, the HARQ management component 1110 may determine that the first field has a second length that spans multiple bits based on the mode that disables acknowledgment feedback reporting being configured for the UE, where the second control message includes the first field and the first field of the second control message includes the second indication.

In some examples, the HARQ management component 1110 may determine that a second field for supporting acknowledgment feedback reporting is alternatively configured to indicate original data transmission or repeated data transmission based on the mode that disables acknowledgment feedback reporting being configured for the UE, where the second control message includes the first field and the second field, the first field includes a first portion of the second indication, and the second field includes a second portion of the second indication.

In some examples, the HARQ management component 1110 may determine that a second field for padding is alternatively configured to indicate original data transmission or repeated data transmission based on the mode that disables acknowledgment feedback reporting being configured for the UE, where the second control message includes the first field and the second field, the first field of the second control message includes a first portion of the second indication, and the second field of the second control message includes a second portion of the second indication.

The HARQ configuration component 1115 may transmit a configuration message configuring a mode that disables acknowledgment feedback reporting for the UE. In some examples, the HARQ configuration component 1115 may transmit control signaling including a sequence of a set of redundancy versions. In some examples, the sequence includes a first amount of repetitions of each redundancy version of the set of redundancy versions. In some examples, the sequence includes a redundancy version of the set of redundancy versions that is associated with original data.

The HARQ communication component 1120 may communicate the second data transmission based on the second indication.

As also described herein, the HARQ configuration component 1115 may transmit a configuration message configuring a mode that disables acknowledgment feedback reporting for the UE.

The HARQ management component 1110 may transmit a first control message comprising a first indication that original data is to be included in a first data transmission scheduled by the first control message, the first data transmission being associated with a HARQ process; and transmit, after the first control message, a second control message comprising a second indication that repeated data is to be included in a second data transmission scheduled by the second control message, the second control message being associated with the HARQ process.

The HARQ communication component 1120 may communicate, based at least in part on the mode being configured for the UE, an original set of data in the second data transmission based at least in part on a timing threshold associated with the first control message the first control message being exceeded.

In some examples, the HARQ management component 1110 may transmit an indication of the timing threshold, where the timing threshold may be based on a threshold quantity of slots. Additionally, or alternatively, the HARQ management component 1110 may transmit an indication of the timing threshold, where the timing threshold may be based on a threshold duration.

In some examples, the HARQ communication component 1120 may transmit a first data message scheduled by the first control message and transmitting a second data message scheduled by the second control message.

Figure 12:
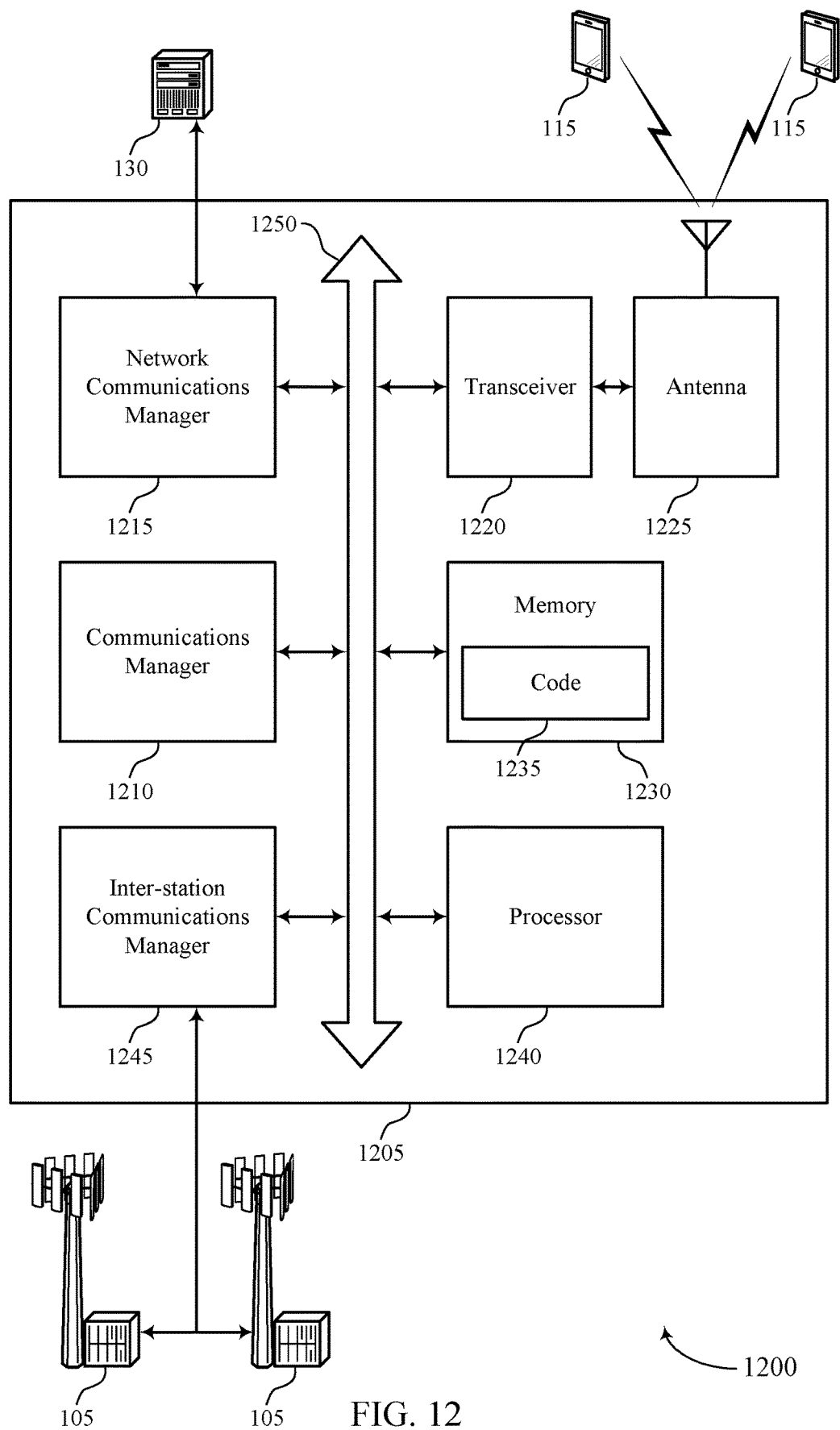
FIG. 12 shows a diagram of a system including a device that supports indicating original data communications in accordance with one or more aspects of the present disclosure.

FIG. 12 shows a diagram of a system 1200 including a device 1205 that supports indicating original data communications in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

As described herein, the communications manager 1210 may transmit a first control message including a first indication that one of original data or repeated data is to be included in a first data transmission scheduled by the first control message for a UE, the first indication having a single bit, transmit, based on the mode being configured for the UE, a second control message including a second indication that one of original data or repeated data is to be included in a second data transmission scheduled by the second control message, the second indication having a plurality of bits (e.g., two or more bits), transmit a configuration message configuring a mode that disables acknowledgment feedback reporting for the UE, and communicate the second data transmission based on the second indication.

As also described herein, the communications manager 1210 may transmit a configuration message configuring a mode that disables acknowledgment feedback reporting for the UE; transmit a first control message comprising a first indication that original data is to be included in a first data transmission scheduled by the first control message, the first data transmission being associated with a HARQ process; transmit, after the first control message, a second control message comprising a second indication that repeated data is to be included in a second data transmission scheduled by the second control message, the second control message being associated with the HARQ process; and communicate, based at least in part on the mode being configured for the UE, an original set of data in the second data transmission based at least in part on a timing threshold associated with the first control message the first control message being exceeded.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting indicating original data communications).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
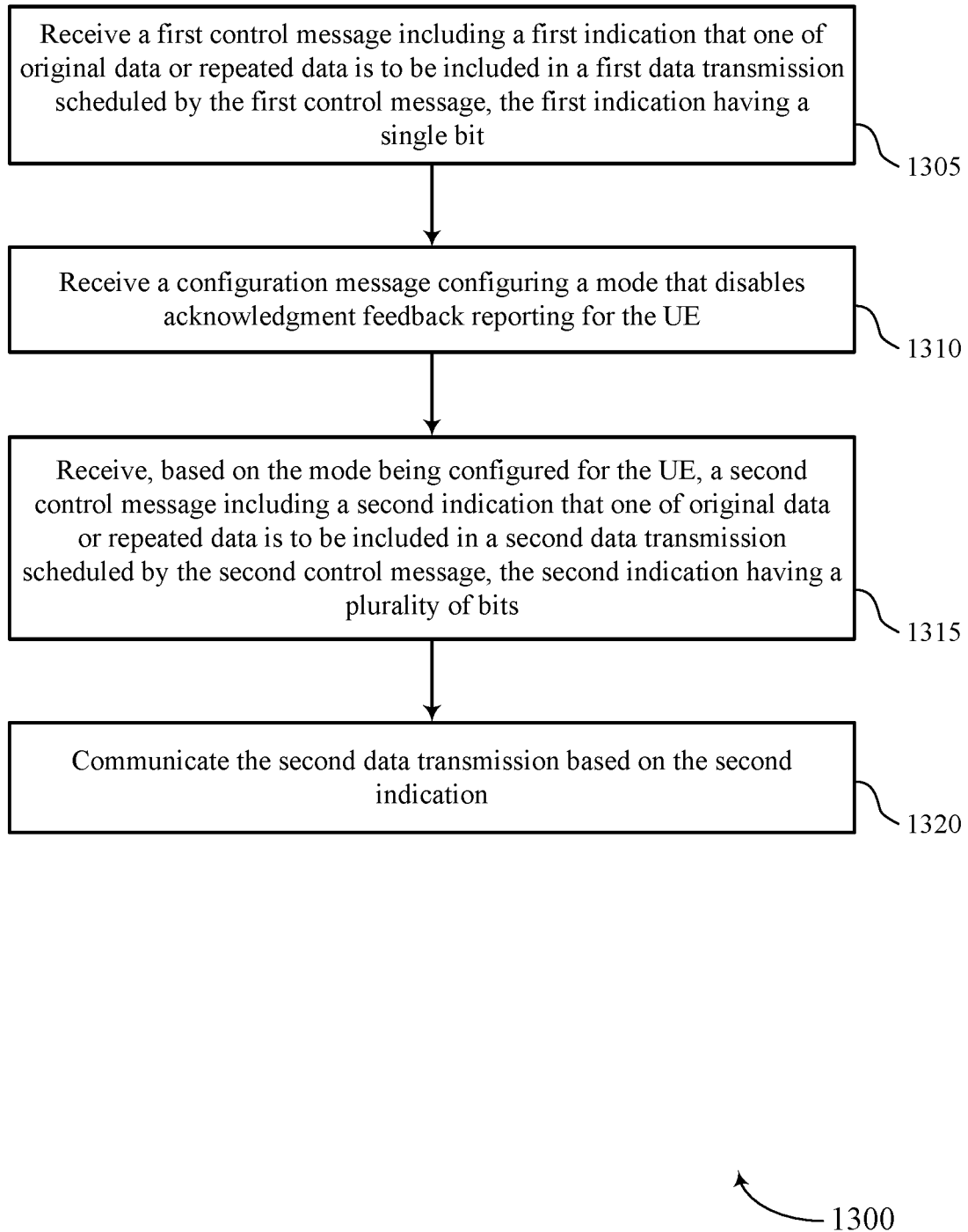
FIGS. 13 through 16 show flowcharts illustrating methods that support indicating original data communications in accordance with one or more aspects of the present disclosure.

FIG. 13 shows a flowchart illustrating a method 1300 that supports indicating original data communications in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive a first control message including a first indication that one of original data or repeated data is to be included in a first data transmission scheduled by the first control message, the first indication having a single bit. The operations of 1305 may be performed according to the methods described herein. In some examples, aspects of the operations of 1305 may be performed by a HARQ processing component as described with reference to FIGS. 5 through 8.

At 1310, the UE may receive a configuration message configuring a mode that disables acknowledgment feedback reporting for the UE. The operations of 1310 may be performed according to the methods described herein. In some examples, aspects of the operations of 1310 may be performed by a HARQ configuration component as described with reference to FIGS. 5 through 8.

At 1315, the UE may receive, based on the mode being configured for the UE, a second control message including a second indication that one of original data or repeated data is to be included in a second data transmission scheduled by the second control message, the second indication having a plurality of bits (e.g., two or more bits). The operations of 1315 may be performed according to the methods described herein. In some examples, aspects of the operations of 1315 may be performed by a HARQ processing component as described with reference to FIGS. 5 through 8.

At 1320, the UE may communicate the second data transmission based on the second indication. The operations of 1320 may be performed according to the methods described herein. In some examples, aspects of the operations of 1320 may be performed by a HARQ communication component as described with reference to FIGS. 5 through 8.

Figure 14:
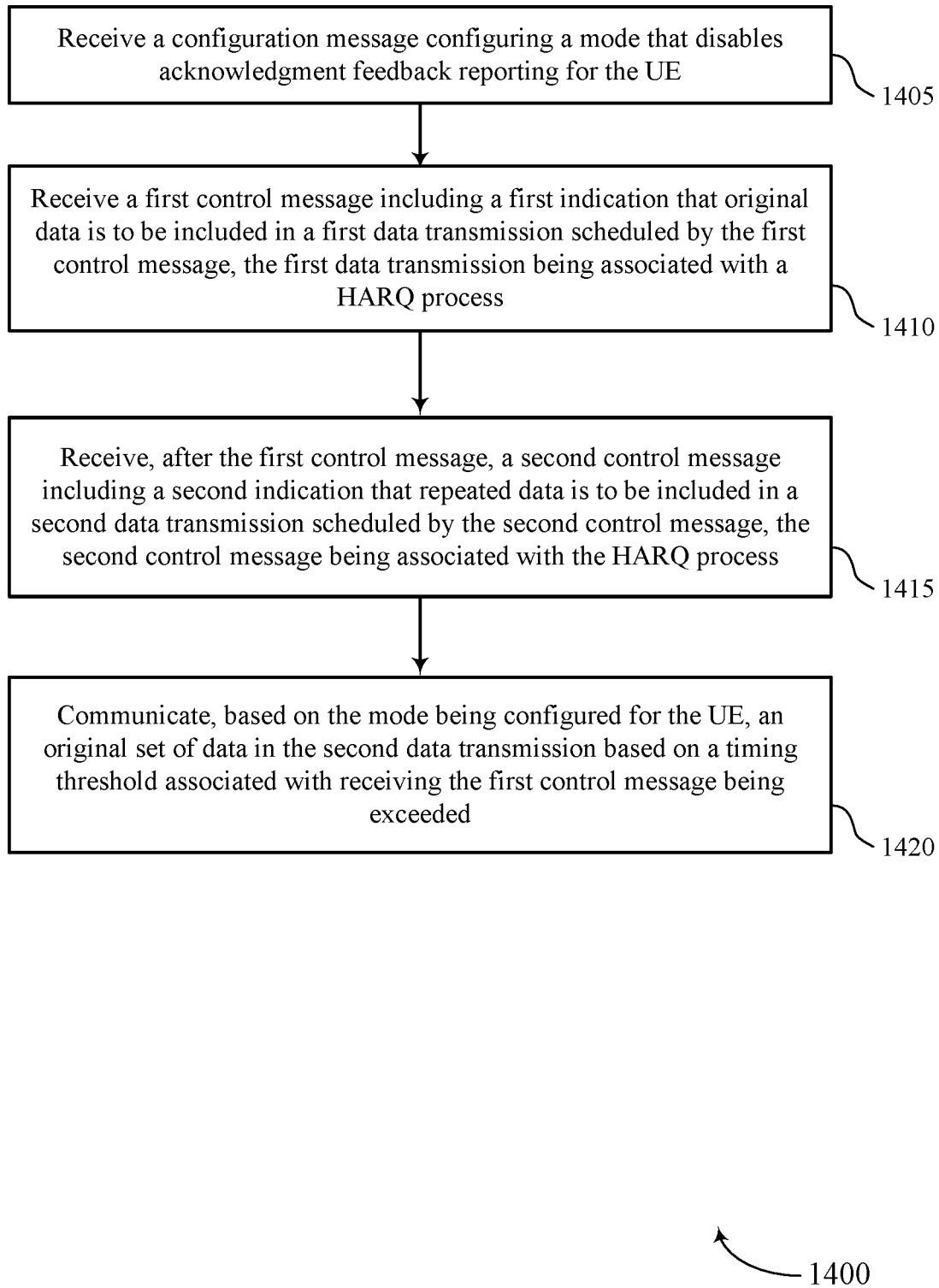

FIG. 14 shows a flowchart illustrating a method 1400 that supports indicating original data communications in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1405, the UE may receive a configuration message configuring a mode that disables acknowledgment feedback reporting for the UE. The operations of 1405 may be performed according to the methods described herein. In some examples, aspects of the operations of 1405 may be performed by an UE2 HARQ configuration component as described with reference to FIGS. 5 through 8.

At 1410, the UE may receive a first control message including a first indication that original data is to be included in a first data transmission scheduled by the first control message, the first data transmission being associated with a HARQ process. The operations of 1410 may be performed according to the methods described herein. In some examples, aspects of the operations of 1410 may be performed by an UE2 HARQ processing component as described with reference to FIGS. 5 through 8.

At 1415, the UE may receive, after the first control message, a second control message including a second indication that repeated data is to be included in a second data transmission scheduled by the second control message, the second control message being associated with the HARQ process. The operations of 1415 may be performed according to the methods described herein. In some examples, aspects of the operations of 1415 may be performed by an UE2 HARQ processing component as described with reference to FIGS. 5 through 8.

At 1420, the UE may communicate, based on the mode being configured for the UE, an original set of data in the second data transmission based on a timing threshold associated with the first control message the first control message being exceeded. The operations of 1420 may be performed according to the methods described herein. In some examples, aspects of the operations of 1420 may be performed by an UE2 HARQ communication component as described with reference to FIGS. 5 through 8.

Figure 15:
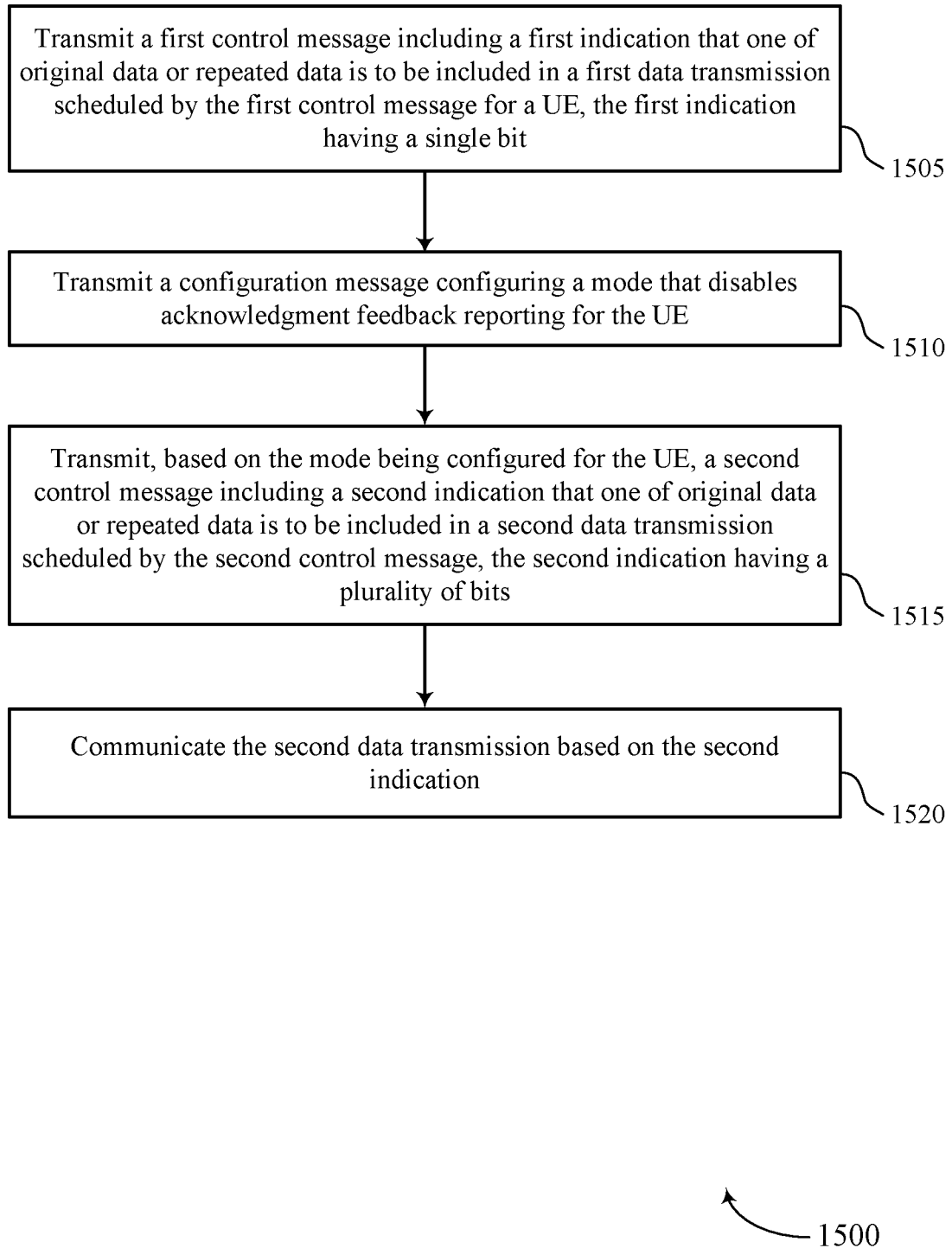

FIG. 15 shows a flowchart illustrating a method 1500 that supports indicating original data communications in accordance with one or more aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1505, the base station may transmit a first control message including a first indication that one of original data or repeated data is to be included in a first data transmission scheduled by the first control message for a UE, the first indication having a single bit. The operations of 1505 may be performed according to the methods described herein. In some examples, aspects of the operations of 1505 may be performed by a HARQ management component as described with reference to FIGS. 9 through 12.

At 1510, the base station may transmit a configuration message configuring a mode that disables acknowledgment feedback reporting for the UE. The operations of 1510 may be performed according to the methods described herein. In some examples, aspects of the operations of 1510 may be performed by a HARQ configuration component as described with reference to FIGS. 9 through 12.

At 1515, the base station may transmit, based on the mode being configured for the UE, a second control message including a second indication that one of original data or repeated data is to be included in a second data transmission scheduled by the second control message, the second indication having a plurality of bits (e.g., two or more bits). The operations of 1515 may be performed according to the methods described herein. In some examples, aspects of the operations of 1515 may be performed by a HARQ management component as described with reference to FIGS. 9 through 12.

At 1520, the base station may communicate the second data transmission based on the second indication. The operations of 1520 may be performed according to the methods described herein. In some examples, aspects of the operations of 1520 may be performed by a HARQ communication component as described with reference to FIGS. 9 through 12.

Figure 16:
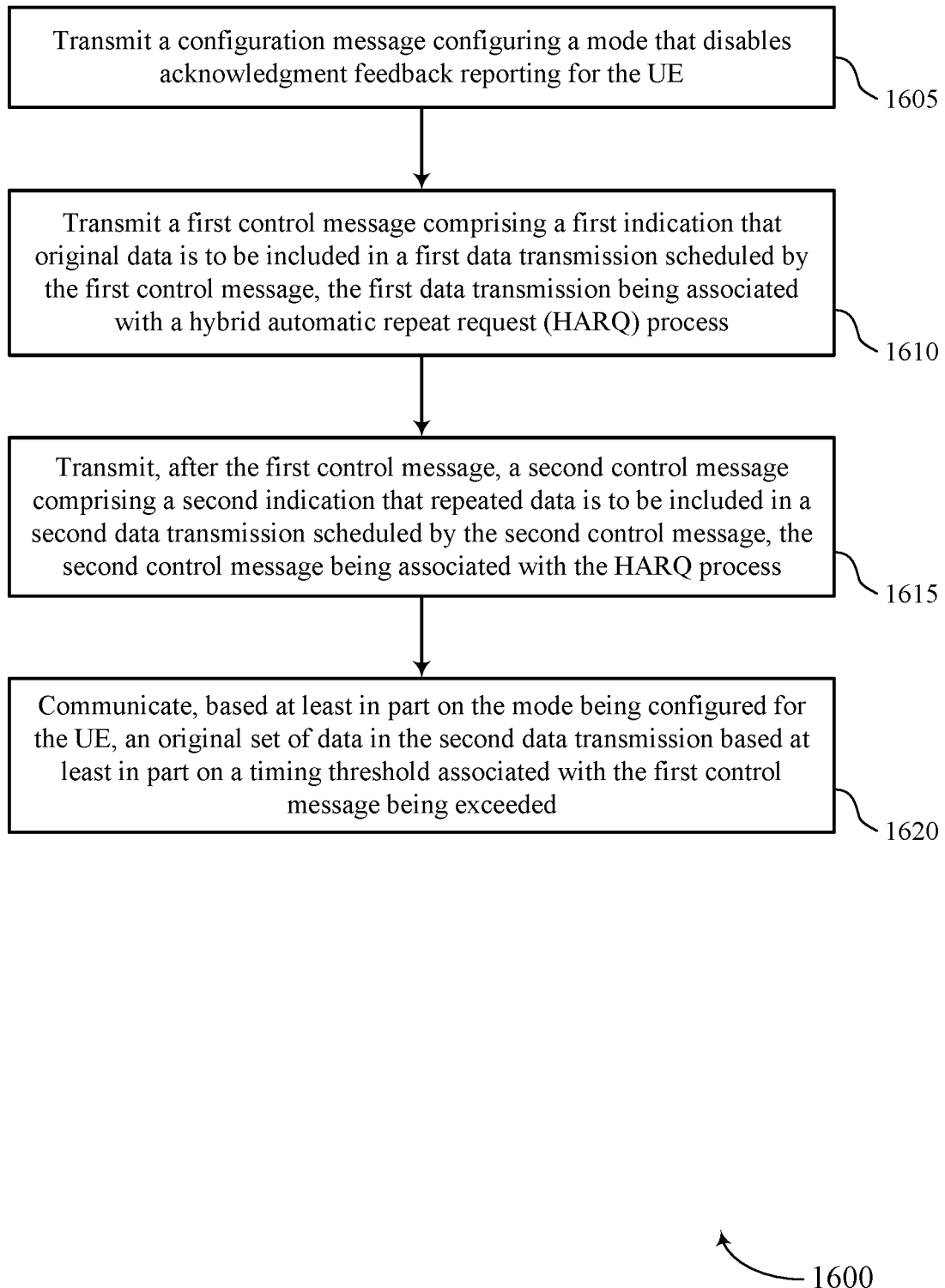

FIG. 16 shows a flowchart illustrating a method 1600 that supports indicating original data communications in accordance with one or more aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1605, the base station may transmit a configuration message configuring a mode that disables acknowledgment feedback reporting for the UE. The operations of 1605 may be performed according to the methods described herein. In some examples, aspects of the operations of 1605 may be performed by a HARQ configuration component as described with reference to FIGS. 9 through 12.

At 1610, the base station may transmit a first control message comprising a first indication that original data is to be included in a first data transmission scheduled by the first control message, the first data transmission being associated with a HARQ process. The operations of 1610 may be performed according to the methods described herein. In some examples, aspects of the operations of 1610 may be performed by a HARQ management component as described with reference to FIGS. 9 through 12.

At 1615, transmit, after the first control message, a second control message comprising a second indication that repeated data is to be included in a second data transmission scheduled by the second control message, the second control message being associated with the HARQ process. The operations of 1615 may be performed according to the methods described herein. In some examples, aspects of the operations of 1615 may be performed by a HARQ management component as described with reference to FIGS. 9 through 12.

At 1620, the base station may communicate, based at least in part on the mode being configured for the UE, an original set of data in the second data transmission based at least in part on a timing threshold associated with the first control message the first control message being exceeded. The operations of 1620 may be performed according to the methods described herein. In some examples, aspects of the operations of 1620 may be performed by a HARQ communication component as described with reference to FIGS. 9 through 12.

Aspect 1: A method for wireless communications at a user equipment (UE), comprising: receiving a first control message comprising a first indication that one of original data or repeated data is to be included in a first data transmission scheduled by the first control message, the first indication having a single bit; receiving a configuration message configuring a mode that disables acknowledgment feedback reporting for the UE; receiving, based at least in part on the mode being configured for the UE, a second control message comprising a second indication that one of original data or repeated data is to be included in a second data transmission scheduled by the second control message, the second indication having a plurality of bits; and communicating the second data transmission based at least in part on the second indication.

Aspect 2: The method of aspect 1, further comprising: disabling acknowledgment feedback reporting for a first HARQ process of a plurality of HARQ processes configured for the UE based at least in part on the configuration message, the second indication being associated with the first HARQ process, the acknowledgment feedback reporting remaining enabled for a second HARQ process of the plurality of HARQ processes based at least in part on the configuration message.

Aspect 3: The method of any one of aspects 1 or 2, further comprising: receiving control signaling indicating that the second indication comprises the plurality of bits based at least in part on the mode that disables acknowledgment feedback reporting being configured for the UE.

Aspect 4: The method of any one of aspects 1 through 3, further comprising: determining that a first field for indicating original data transmission or repeated data transmission has a first length that spans one bit based at least in part on a second mode that enables acknowledgement feedback reporting being configured for the UE, the first control message comprising the first field.

Aspect 5: The method of any one of aspects 1 through 4, further comprising: determining that the first field has a second length that spans multiple bits based at least in part on the mode that disables acknowledgment feedback reporting being configured for the UE, the second control message comprising the first field.

Aspect 6: The method of aspect 5, the first control message being received based at least in part on the first length of the first field, the first field of the first control message comprising the first indication, and the second control message being received based at least in part on the second length of the first field, the first field of the second control message comprising the second indication.

Aspect 7: The method of any one of aspects 5 or 6, further comprising: receiving, based at least in part on the mode that disables acknowledgment feedback reporting being configured for the UE, a third control message comprising a third indication that one of original data or repeated data is to be included in a third data transmission scheduled by the third control message; and determining that the third data transmission comprises an original set of data based at least in part on the third indication and the second indication.

Aspect 8: The method of any one of aspects 5 through 7, further comprising: comparing the third indication of the third control message with the second indication of the second control message, the determining that the third data transmission comprises the original set of data being based at least in part on a second value of the second indication being different than a third value of the third indication.

Aspect 9: The method of any one of aspects 1 through 4, further comprising: determining that a second field for supporting acknowledgment feedback reporting is alternatively configured to indicate original data transmission or repeated data transmission based at least in part on the mode that disables acknowledgment feedback reporting being configured for the UE, the second control message comprising the first field and the second field.

Aspect 10: The method of aspect 9, the first field comprising a first portion of the second indication and the second field comprising a second portion of the second indication.

Aspect 11: The method of any one of aspects 9 or 10, the second field being associated with a disabled hybrid automatic repeat request process.

Aspect 12: The method of any one of aspects 9 through 11, further comprising: receiving, based at least in part on the mode that disables acknowledgment feedback reporting being configured for the UE, a third control message comprising a third indication that one of original data or repeated data is to be included in a third data transmission scheduled by the third control message; determining that the third data transmission comprises an original set of data based at least in part on the second indication and the third indication.

Aspect 13: The method of aspect 12, further comprising: comparing the third indication of the third control message with the second indication of the second control message, the determining that the third data transmission comprises the original set of data being based at least in part on a second value of the second indication being different than a third value of the third indication.

Aspect 14: The method of any one of aspects 1 through 4, further comprising: determining that a second field for padding is alternatively configured to indicate original data transmission or repeated data transmission based at least in part on the mode that disables acknowledgment feedback reporting being configured for the UE, the second control message comprising the first field and the second field, the first field of the second control message comprising a first portion of the second indication, and the second field of the second control message comprising a second portion of the second indication.

Aspect 15: The method of any one of aspects 1 through 4, further comprising: determining that a second field for indicating redundancy versions is further configured to indicate original data transmission or repeated data transmission based at least in part on the mode that disables acknowledgment feedback reporting being configured for the UE, the second control message comprising the first field and the second field.

Aspect 16: The method of aspect 15, the first field comprising a first portion of the second indication and the second field comprising a second portion of the second indication.

Aspect 17: The method of any one of aspects 15 or 16, the second control message comprising a third indication that the second data transmission is scheduled to use one of a plurality of redundancy versions, the method further comprising: receiving, based at least in part on the mode that disables acknowledgment feedback reporting being configured for the UE, a third control message comprising a fourth indication that one of original data or repeated data is to be included in a third data transmission scheduled by the third control message, and a fifth indication that the third data transmission is scheduled to use one of the plurality of redundancy versions; and determining that the third data transmission comprises an original set of data based at least in part on the second indication, the third indication, the fourth indication, and the fifth indication.

Aspect 18: The method of any one of aspects 15 through 17, further comprising: comparing the fourth indication of the third control message with the second indication of the second control message and the fifth indication of the third control message with the third indication of the second control message, the determining that the third data transmission comprises the original set of data being based at least in part on a fourth value of the fourth indication being equal to a second value of the second indication.

Aspect 19: The method of any one of aspects 15 through 18, the determining that the third data transmission comprises the original set of data being based at least in part on a fifth value of the fifth indication of the third control message being equal to a third value of the third indication of the second control message.

Aspect 20: The method of any one of aspects 15 through 19, the determining that the third data transmission comprises the original set of data being based at least in part on the fifth indication of the third control message indicating a redundancy version of the plurality of redundancy versions that is associated with original data.

Aspect 21: The method of any one of aspects 15 through 19, further comprising: receiving control signaling comprising a sequence of the plurality of redundancy versions, the sequence comprising a first amount of repetitions of each of the plurality of redundancy versions, the determining that the third data transmission comprises the original set of data being based at least in part on the fifth indication of the third control message indicating a second amount of repetitions for a redundancy version in the sequence that is greater than the first amount of repetitions.

Aspect 22: The method of any one of aspects 1 through 21, further comprising: decoding the second control message based at least in part on the mode that disables acknowledgment feedback reporting being configured for the UE; and identifying that a downlink transmission is scheduled by the second control message comprises a downlink data transmission based at least in part on the second control message.

Aspect 23: The method of any one of aspects 1 through 22, further comprising: identifying that the downlink data transmission includes an original set of data based at least in part on the second indication included in the second control message, the communicating the second data transmission comprising receiving, from a base station, the original set of data in the downlink data transmission, the original set of data being transmitted by the base station for an initial time in the downlink data transmission.

Aspect 24: The method of any one of aspects 1 through 22, further comprising: identifying that the downlink data transmission includes a repeated set of data based at least in part on the second indication included in the second control message, the communicating the second data transmission comprising receiving, from a base station, the repeated set of data in the downlink data transmission, the repeated set of data being previously transmitted in a prior downlink data transmission.

Aspect 25: The method of any one of aspects 1 through 21, further comprising decoding the second control message based at least in part on the mode that disables acknowledgment feedback reporting being configured for the UE; and identifying that an uplink data transmission is scheduled by the second control message based at least in part on the second control message.

Aspect 26: The method of any one of aspects 1 through 21 or 25, further comprising: identifying that the uplink data transmission includes an original set of data based at least in part on the second indication included in the second control message; generating the uplink data transmission comprising the original set of data based at least in part on the second indication, the communicating the second data transmission comprising transmitting, to a base station, the original set of data in the uplink data transmission, the original set of data being transmitted by the UE for an initial time in the uplink data transmission.

Aspect 27: The method of any one of aspects 1 through 21 or 25, further comprising: identifying that the uplink data transmission includes a repeated set of data based at least in part on the second indication included in the second control message; generating the uplink data transmission comprising the repeated set of data based at least in part on the second indication, the communicating the second data transmission comprising transmitting, to a base station, the repeated set of data in the uplink data transmission, the repeated set of data being previously transmitted by the UE in a prior uplink data transmission.

Aspect 28: A method for wireless communications at a UE, comprising: receiving a configuration message configuring a mode that disables acknowledgment feedback reporting for the UE; receiving a first control message comprising a first indication that original data is to be included in a first data transmission scheduled by the first control message, the first data transmission being associated with a HARQ process; receiving, after the first control message, a second control message comprising a second indication that repeated data is to be included in a second data transmission scheduled by the second control message, the second control message being associated with the HARQ process; and communicating, based at least in part on the mode being configured for the UE, an original set of data in the second data transmission based at least in part on a timing threshold associated with receiving the first control message being exceeded.

Aspect 29: The method of aspect 28, further comprising: receiving an indication of the timing threshold, the timing threshold being based at least in part on a threshold quantity of slots.

Aspect 30: The method of any one of aspects 28 or 29, the first control message being received in a first slot and the second control message is received in a second slot, the method further comprising: determining that a quantity of slots located between the first slot and the second slot exceeds the threshold quantity of slots; and determining that the second data transmission comprises the original set of data based at least in part on the quantity of slots located between the first slot and the second slot exceeding the threshold quantity of slots.

Aspect 31: The method of any one of aspects 28 through 30, further comprising: decoding the second control message based at least in part on the mode that disables acknowledgment feedback reporting being configured for the UE; and identifying that a downlink data transmission is scheduled by the second control message based at least in part on the second control message, the communicating the second data transmission comprising receiving, from a base station, the original set of data in the downlink data transmission based at least in part on the quantity of slots located between the first slot and the second slot exceeding the threshold quantity of slots, the original set of data being transmitted by the base station for an initial time in the downlink data transmission.

Aspect 32: The method of any one of aspects 28 through 31, further comprising: decoding the second control message based at least in part on the mode that disables acknowledgment feedback reporting being configured for the UE; identifying that an uplink data transmission is scheduled by the second control message based at least in part on the second control message; and generating the uplink data transmission comprising the original set of data based at least in part on the identifying, the communicating the second data transmission comprising transmitting, to a base station, the original set of data in the uplink data transmission based at least in part on the quantity of slots located between the first slot and the second slot exceeding the threshold quantity of slots, the original set of data being transmitted by the UE for an initial time in the uplink data transmission.

Aspect 33: The method of any one of aspects 28 or 29, further comprising: identifying first data resources in the first data transmission scheduled by the first control message in a first slot; identifying second data resources in the second data transmission scheduled by the second control message in a second slot; determining that a quantity of slots located between the first slot and the second slot exceeds the threshold quantity of slots; and determining that the second data transmission comprises the original set of data based at least in part on the quantity of slots located between the first slot and the second slot exceeding the threshold quantity of slots.

Aspect 34: The method of any one of aspects 28, 29, or 33, further comprising: receiving an indication of the timing threshold, the timing threshold being based at least in part on a threshold duration.

Aspect 35: The method of any one of aspects 28, 29, 33, or 34, further comprising: initiating a timer based at least in part on receiving the first control message; determining that a value of the timer when the second control message is received exceeds the threshold duration; and determining that the second data transmission comprises the original set of data based at least in part on the value of the timer exceeding the threshold duration.

Aspect 36: The method of any one of aspects 28, 29, 33 through 35, further comprising: receiving a first data message scheduled by the first control message; initiating a timer based at least in part on receiving the first data message; receiving a second data message scheduled by the second control message; determining that a value of the timer when the second data message is received exceeds the threshold duration; and determining that the second data transmission comprises the original set of data based at least in part on the value of the timer exceeding the threshold duration.

Aspect 37: A method for wireless communications at a base station, comprising: transmitting a first control message comprising a first indication that one of original data or repeated data is to be included in a first data transmission scheduled by the first control message for a UE, the first indication having a single bit; transmitting a configuration message configuring a mode that disables acknowledgment feedback reporting for the UE; transmitting, based at least in part on the mode being configured for the UE, a second control message comprising a second indication that one of original data or repeated data is to be included in a second data transmission scheduled by the second control message, the second indication having a plurality of bits; and communicating the second data transmission based at least in part on the second indication.

Aspect 38: The method of aspect 37, further comprising: determining that a first field for indicating original data transmission or repeated data transmission has a first length that spans one bit based at least in part on a second mode that enables acknowledgement feedback reporting being configured for the UE, the first control message comprising the first field and the first field comprises the first indication.

Aspect 39: The method of any one of aspects 37 or 38, further comprising: determining that the first field has a second length that spans multiple bits based at least in part on the mode that disables acknowledgment feedback reporting being configured for the UE, the second control message comprising the first field and the first field of the second control message comprises the second indication.

Aspect 40: The method of any one of aspects 37 through 39, further comprising: determining that a second field for supporting acknowledgment feedback reporting is alternatively configured to indicate original data transmission or repeated data transmission based at least in part on the mode that disables acknowledgment feedback reporting being configured for the UE, the second control message comprising the first field and the second field, the first field comprising a first portion of the second indication, and the second field comprising a second portion of the second indication.

Aspect 41: The method of any one of aspects 37 through 40, further comprising: determining that a second field for padding is alternatively configured to indicate original data transmission or repeated data transmission based at least in part on the mode that disables acknowledgment feedback reporting being configured for the UE, the second control message comprising the first field and the second field, the first field of the second control message comprising a first portion of the second indication, and the second field of the second control message comprising a second portion of the second indication.

Aspect 42: The method of any one of aspects 37 through 41, further comprising: transmitting control signaling comprising a sequence of a plurality of redundancy versions.

Aspect 43: The method of any one of aspects 37 through 42, the sequence comprising a first amount of repetitions of each redundancy version of the plurality of redundancy versions.

Aspect 44: The method of any one of aspects 37 through 42, the sequence comprising a redundancy version of the plurality of redundancy versions that is associated with original data.

Aspect 45: The method of any one of aspects 37 through 42, the base station being included in a non-terrestrial network.

Aspect 46: A method for wireless communications at a base station, comprising: transmitting a configuration message configuring a mode that disables acknowledgment feedback reporting for the UE; transmitting a first control message comprising a first indication that original data is to be included in a first data transmission scheduled by the first control message, the first data transmission being associated with a HARQ process; transmitting, after the first control message, a second control message comprising a second indication that repeated data is to be included in a second data transmission scheduled by the second control message, the second control message being associated with the HARQ process; and communicating, based at least in part on the mode being configured for the UE, an original set of data in the second data transmission based at least in part on a timing threshold associated with the first control message the first control message being exceeded.

Aspect 47: The method of aspect 46, further comprising: transmitting an indication of the timing threshold, where the timing threshold may be based on a threshold quantity of slots.

Aspect 48: The method of any one of aspects 46 or 47, further comprising: transmitting an indication of the timing threshold, where the timing threshold may be based on a threshold duration.

Aspect 49: The method of any one of aspects 46 through 48, further comprising transmitting a first data message scheduled by the first control message and a second data message scheduled by the second control message.

Aspect 50: An apparatus for wireless communication comprising at least one means for performing a method of any one of aspects 1 through 27.

Aspect 51: An apparatus for wireless communication comprising a processor and memory coupled to the processor. The processor and memory may be configured to cause the apparatus to perform a method of any one of aspects 1 through 27.

Aspect 52: A non-transitory computer-readable medium storing code for wireless communication comprising a processor, memory coupled to the processor, and instructions stored in the memory and executable by the processor to cause the apparatus to perform a method of any one of aspects 1 through 27.

Aspect 53: An apparatus for wireless communication comprising at least one means for performing a method of any one of aspects 28 through 36.

Aspect 54: An apparatus for wireless communication comprising a processor and memory coupled to the processor. The processor and memory may be configured to cause the apparatus to perform a method of any one of aspects 28 through 36.

Aspect 55: A non-transitory computer-readable medium storing code for wireless communication comprising a processor, memory coupled to the processor, and instructions stored in the memory and executable by the processor to cause the apparatus to perform a method of any one of aspects 28 through 36.

Aspect 56: An apparatus for wireless communication comprising at least one means for performing a method of any one of aspects 37 through 45.

Aspect 57: An apparatus for wireless communication comprising a processor and memory coupled to the processor. The processor and memory may be configured to cause the apparatus to perform a method of any one of aspects 37 through 45.

Aspect 58: A non-transitory computer-readable medium storing code for wireless communication comprising a processor, memory coupled to the processor, and instructions stored in the memory and executable by the processor to cause the apparatus to perform a method of any one of aspects 37 through 45.

Aspect 59: An apparatus for wireless communication comprising at least one means for performing a method of any one of aspects 46 through 49.

Aspect 60: An apparatus for wireless communication comprising a processor and memory coupled to the processor. The processor and memory may be configured to cause the apparatus to perform a method of any one of aspects 46 through 49.

Aspect 61: A non-transitory computer-readable medium storing code for wireless communication comprising a processor, memory coupled to the processor, and instructions stored in the memory and executable by the processor to cause the apparatus to perform a method of any one of aspects 46 through 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a first downlink control information message comprising a first new data indication that one of new data or repeated data is to be included in a first data transmission of an active hybrid automatic repeat request (HARQ) process configured for the UE, the first data transmission scheduled by the first downlink control information message, and the first new data indication having a single bit;

receiving a configuration message configuring a mode that disables acknowledgment feedback reporting for the active HARQ process;

receiving, based at least in part on the mode being configured for the active HARQ process, a second downlink control information message comprising a second new data indication that one of new data or repeated data is to be included in a second data transmission of the active HARQ process, the second data transmission scheduled by the second downlink control information message, and the second new data indication having a plurality of bits; and communicating the second data transmission based at least in part on the second new data indication.

2. The method of claim 1, further comprising:

disabling acknowledgment feedback reporting for the active HARQ process based at least in part on the configuration message, the second new data indication being associated with the active HARQ process, and the acknowledgement feedback reporting remaining enabled for a second active HARQ process configured for the UE based at least in part on the configuration message.

3. The method of claim 1, further comprising:

receiving control signaling indicating that the second new data indication comprises the plurality of bits based at least in part on the mode that disables acknowledgment feedback reporting being configured for the UE.

4. The method of claim 1, further comprising:

determining that a first field for indicating new data transmission or repeated data transmission has a first length that spans one bit based at least in part on a second mode that enables acknowledgement feedback reporting being configured for the UE, the first downlink control information message comprising the first field.

5. The method of claim 4, further comprising:
determining that a second field for indicating redundancy versions is further configured to indicate new data transmission or repeated data transmission based at least in part on the mode that disables acknowledgment feedback reporting being configured for the UE, the second downlink control information message comprising the first field and the second field.

6. The method of claim 5, the first field comprising a first portion of the second new data indication and the second field comprising a second portion of the second new data indication.

7. The method of claim 5, the second downlink control information message comprising a third new data indication that the second data transmission is scheduled to use one of a plurality of redundancy versions, the method further comprising:
receiving, based at least in part on the mode that disables acknowledgment feedback reporting being configured for the UE, a third control message comprising:
a fourth new data indication that one of new data or repeated data is to be included in a third data transmission scheduled by the third control message, and
a fifth new data indication that the third data transmission is scheduled to use one of the plurality of redundancy versions; and
determining that the third data transmission comprises a new set of data based at least in part on the second new data indication, the third new data indication, the fourth new data indication, and the fifth new data indication.

8. The method of claim 7, further comprising:
comparing the fourth new data indication of the third control message with the second new data indication of the second downlink control information message and the fifth new data indication of the third control message with the third new data indication of the second downlink control information message, the determining that the third data transmission comprises the new set of data being based at least in part on a fourth value of the fourth new data indication being equal to a second value of the second new data indication.

9. The method of claim 8, the determining that the third data transmission comprises the new set of data being based at least in part on a fifth value of the fifth new data indication of the third control message being equal to a third value of the third new data indication of the second downlink control information message.

10. The method of claim 8, the determining that the third data transmission comprises the new set of data being based at least in part on the fifth new data indication of the third control message indicating a redundancy version of the plurality of redundancy versions that is associated with new data.

11. The method of claim 8, further comprising:
receiving control signaling comprising a sequence of the plurality of redundancy versions, the sequence comprising a first amount of repetitions of each of the plurality of redundancy versions, the determining that the third data transmission comprises the new set of data being based at least in part on the fifth new data indication of the third control message indicating a second amount of repetitions for a redundancy version in the sequence that is greater than the first amount of repetitions.

12. The method of claim 4, further comprising:
determining that the first field has a second length that spans multiple bits based at least in part on the mode that disables acknowledgment feedback reporting being configured for the UE, the second downlink control information message comprising the first field.

13. The method of claim 12:
the first downlink control information message being received based at least in part on the first length of the first field, the first field of the first downlink control information message comprising the first new data indication, and
the second downlink control information message being received based at least in part on the second length of the first field, the first field of the second downlink control information message comprising the second new data indication.

14. The method of claim 12, further comprising:
receiving, based at least in part on the mode that disables acknowledgment feedback reporting being configured for the UE, a third control message comprising a third new data indication that one of new data or repeated data is to be included in a third data transmission scheduled by the third control message; and
determining that the third data transmission comprises a new set of data based at least in part on the third new data indication and the second new data indication.

15. The method of claim 14, further comprising:
comparing the third new data indication of the third control message with the second new data indication of the second downlink control information message, the determining that the third data transmission comprises the new set of data being based at least in part on a second value of the second new data indication being different than a third value of the third new data indication.

16. The method of claim 4, further comprising:
determining that a second field for supporting acknowledgment feedback reporting is alternatively configured to indicate new data transmission or repeated data transmission based at least in part on the mode that disables acknowledgment feedback reporting being configured for the UE, the second downlink control information message comprising the first field and the second field.

17. The method of claim 16, the first field comprising a first portion of the second new data indication and the second field comprising a second portion of the second new data indication.

18. The method of claim 16, the second field being associated with a disabled HARQ process.

19. The method of claim 16, further comprising:
receiving, based at least in part on the mode that disables acknowledgment feedback reporting being configured for the UE, a third control message comprising a third new data indication that one of new data or repeated data is to be included in a third data transmission scheduled by the third control message; and
determining that the third data transmission comprises a new set of data based at least in part on the second new data indication and the third new data indication.

20. The method of claim 19, further comprising:
comparing the third new data indication of the third control message with the second new data indication of the second downlink control information message, the determining that the third data transmission comprises the new set of data being based at least in part on a second value of the second new data indication being different than a third value of the third new data indication.

21. The method of claim 4, further comprising:
determining that a second field for padding is alternatively configured to indicate new data transmission or repeated data transmission based at least in part on the mode that disables acknowledgment feedback reporting being configured for the UE, the second downlink control information message comprising the first field and the second field, the first field of the second downlink control information message comprising a first portion of the second new data indication, and the second field of the second downlink control information message comprising a second portion of the second new data indication.

22. The method of claim 1, further comprising:
decoding the second downlink control information message based at least in part on the mode that disables acknowledgment feedback reporting being configured for the UE; and
identifying that a downlink transmission is scheduled by the second downlink control information message comprises a downlink data transmission based at least in part on the second downlink control information message.

23. The method of claim 22, further comprising:
identifying that the downlink data transmission includes a new set of data based at least in part on the second new data indication included in the second downlink control information message, the communicating the second data transmission comprising:
receiving, from a network entity, the new set of data in the downlink data transmission, the new set of data being transmitted by the network entity for an initial time in the downlink data transmission.

24. The method of claim 22, further comprising:
identifying that the downlink data transmission includes a repeated set of data based at least in part on the second new data indication included in the second downlink control information message, the communicating the second data transmission comprising:
receiving, from a network entity, the repeated set of data in the downlink data transmission, the repeated set of data being previously transmitted in a prior downlink data transmission.

25. The method of claim 1, further comprising:
decoding the second downlink control information message based at least in part on the mode that disables acknowledgment feedback reporting being configured for the UE; and
identifying that an uplink data transmission is scheduled by the second downlink control information message based at least in part on the second downlink control information message.

26. The method of claim 25, further comprising:
identifying that the uplink data transmission includes a new set of data based at least in part on the second new data indication included in the second downlink control information message; and
generating the uplink data transmission comprising the new set of data based at least in part on the second new data indication, communicating the second data transmission comprising:
transmitting, to a network entity, the new set of data in the uplink data transmission, the new set of data being transmitted by the UE for an initial time in the uplink data transmission.

27. The method of claim 25, further comprising:
identifying that the uplink data transmission includes a repeated set of data based at least in part on the second new data indication included in the second downlink control information message; and
generating the uplink data transmission comprising the repeated set of data based at least in part on the second new data indication, communicating the second data transmission comprising:
transmitting, to a network entity, the repeated set of data in the uplink data transmission, the repeated set of data being previously transmitted by the UE in a prior uplink data transmission.

28. A method for wireless communications at a user equipment (UE), comprising:
receiving a configuration message configuring a mode that disables acknowledgment feedback reporting for an active hybrid automatic repeat request (HARQ) process;
receiving a first downlink control information message comprising a first new data indication that new data is to be included in a first data transmission scheduled by the first downlink control information message, the first data transmission being associated with the active HARQ process;
receiving, after the first downlink control information message, a second downlink control information message comprising a second new data indication that repeated data is to be included in a second data transmission scheduled by the second downlink control information message, the second downlink control information message being associated with the active HARQ process; and
communicating, based at least in part on the mode being configured for the active HARQ process, a new set of data in the second data transmission based at least in part on a timing threshold associated with a time duration between receiving the first downlink control information message and receiving the second downlink control information message being exceeded.

29. The method of claim 28, further comprising:
receiving an indication of the timing threshold, wherein the timing threshold is based at least in part on a threshold quantity of slots.

30. The method of claim 28, further comprising:
receiving an indication of the timing threshold, wherein the timing threshold is based at least in part on a threshold duration.

31. A method for wireless communications at a network entity, comprising:
transmitting a first downlink control information message comprising a first new data indication that one of new data or repeated data is to be included in a first data transmission of an active hybrid automatic repeat request (HARQ) process, the first data transmission scheduled by the first downlink control information message, and the first new data indication having a single bit;
transmitting a configuration message configuring a mode that disables acknowledgment feedback reporting for the active HARQ process;
transmitting, based at least in part on the mode being configured for the active HARQ process, a second downlink control information message comprising a second new data indication that one of new data or repeated data is to be included in a second data transmission of the active HARQ process, the second data transmission scheduled by the second downlink control information message, and the second new data indication having a plurality of bits; and communicating the second data transmission based at least in part on the second new data indication.

32. The method of claim 31, further comprising:
determining that a first field for indicating new data transmission or repeated data transmission has a first length that spans one bit based at least in part on a second mode that enables acknowledgement feedback reporting being configured for the active HARQ process, wherein the first downlink control information message comprises the first field and the first field comprises the first new data indication.

33. The method of claim 31, further comprising:
transmitting control signaling comprising a sequence of a plurality of redundancy versions.

34. A method for wireless communications at a network entity, comprising:
transmitting a configuration message configuring a mode that disables acknowledgment feedback reporting for an active hybrid automatic repeat request (HARQ) process;
transmitting a first downlink control information message comprising a first new data indication that new data is to be included in a first data transmission scheduled by the first downlink control information message, the first data transmission being associated with the active HARQ process;
transmitting, after the first downlink control information message, a second downlink control information message comprising a second new data indication that repeated data is to be included in a second data transmission scheduled by the second downlink control information message, the second downlink control information message being associated with the active HARQ process; and
communicating, based at least in part on the mode being configured for the active HARQ process, a new set of data in the second data transmission based at least in part on a timing threshold associated with a time duration between transmission of the first downlink control information message and transmission of the second downlink control information message being exceeded.

35. The method of claim 34, further comprising:
determining that the mode that disables acknowledgement feedback reporting for the active HARQ process is enabled; and
enabling the timing threshold based at least in part on determining that the mode is enabled.

36. The method of claim 34, further comprising:
transmitting, to a user equipment (UE) associated with the active HARQ process, control signaling indicating the timing threshold based at least in part on the mode that disables acknowledgement feedback reporting being configured for the UE.

37. An apparatus for wireless communication at a user equipment (UE), comprising:
a processor, and
memory coupled with the processor, the processor configured to:

receive a first downlink control information message comprising a first new data indication that one of new data or repeated data is to be included in a first data transmission of an active hybrid automatic repeat request (HARQ) process configured for the UE, the first data transmission scheduled by the first downlink control information message, and the first new data indication having a single bit;
receive a configuration message for configuring a mode that disables acknowledgment feedback reporting for the active HARQ process;
receive, based at least in part on the mode configured for the active HARQ process, a second downlink control information message comprising a second new data indication that one of new data or repeated data is to be included in a second data transmission of the active HARQ process, the second data transmission scheduled by the second downlink control information message, and the second new data indication having a plurality of bits; and
communicate the second data transmission based at least in part on the second new data indication.

38. The apparatus of claim 37, the processor is further configured to:
disable acknowledgment feedback reporting for the active HARQ process based at least in part on the configuration message, the second new data indication being associated with the active HARQ process, wherein the acknowledgement feedback reporting remains enabled for a second active HARQ process configured for the UE based at least in part on the configuration message.

39. The apparatus of claim 37, the processor is further configured to:
receive control signaling for indicating that the second new data indication comprises the plurality of bits based at least in part on the mode that disables acknowledgment feedback reporting being configured for the UE.

40. The apparatus of claim 37, the processor is further configured to:
determine that a first field for indicating new data transmission or repeated data transmission has a first length that spans one bit based at least in part on a second mode that enables acknowledgement feedback reporting being configured for the UE, the first downlink control information message comprising the first field.

41. An apparatus for wireless communication at a user equipment (UE), comprising:
a processor, and
memory coupled with the processor, the processor configured to:
receive a configuration message for configuring a mode that disables acknowledgment feedback reporting for an active hybrid automatic repeat request (HARQ) process;
receive a first downlink control information message comprising a first new data indication that new data is to be included in a first data transmission scheduled by the first downlink control information message, the first data transmission being associated with the active HARQ process;
receive, after the first downlink control information message, a second downlink control information message comprising a second new data indication that repeated data is to be included in a second data transmission scheduled by the second downlink control information message, the second downlink control information message being associated with the active HARQ process; and communicate, based at least in part on the mode configured for the active HARQ process, a new set of data in the second data transmission based at least in part on a timing threshold associated with a time duration between reception of the first downlink control information message and reception of the second downlink control information message being exceeded.

42. The apparatus of claim 41, the processor further configured to:

receive an indication of the timing threshold, wherein the timing threshold is based at least in part on a threshold quantity of slots.

43. The apparatus of claim 41, the processor further configured to:

receive an indication of the timing threshold, wherein the timing threshold is based at least in part on a threshold duration.

44. An apparatus for wireless communication at a network entity, comprising:

a processor, and memory coupled with the processor, the processor configured to:

transmit a first downlink control information message comprising a first new data indication that one of new data or repeated data is to be included in a first data transmission of an active hybrid automatic repeat request (HARQ) process, the first data transmission scheduled by the first downlink control information message, and the first new data indication having a single bit;

transmit a configuration message configuring a mode that disables acknowledgment feedback reporting for the active HARQ process;

transmit, based at least in part on the mode configured for the active HARQ process, a second downlink control information message comprising a second new data indication that one of new data or repeated data is to be included in a second data transmission of the active HARQ process, the second data transmission scheduled by the second downlink control information message, and the second new data indication having a plurality of bits; and communicate the second data transmission based at least in part on the second new data indication.

45. The apparatus of claim 44, the processor further configured to:

determine that a first field for indicating new data transmission or repeated data transmission has a first length that spans one bit based at least in part on a second mode that enables acknowledgement feedback reporting configured for the active HARQ process, wherein the first downlink control information message comprises the first field and the first field comprises the first new data indication.

46. The apparatus of claim 44, the processor further configured to:

transmit control signaling comprising a sequence of a plurality of redundancy versions.

47. An apparatus for wireless communication at a network entity, comprising:

a processor, and memory coupled with the processor, the processor configured to:

transmit a configuration message for configuring a mode that disables acknowledgment feedback reporting for an active hybrid automatic repeat request (HARQ) process;

transmit a first downlink control information message comprising a first new data indication that new data is to be included in a first data transmission scheduled by the first downlink control information message, the first data transmission being associated with the active HARQ process;

transmit, after the first downlink control information message, a second downlink control information message comprising a second new data indication that repeated data is to be included in a second data transmission scheduled by the second downlink control information message, the second downlink control information message being associated with the active HARQ process; and communicate, based at least in part on the mode configured for the active HARQ process, a new set of data in the second data transmission based at least in part on a timing threshold associated with a time duration between transmission of the first downlink control information message and transmission of the second downlink control information message being exceeded.

48. The apparatus of claim 47, the processor further configured to:

determine that the mode that disables acknowledgement feedback reporting for the active HARQ process is enabled; and enable the timing threshold based at least in part on determining that the mode is enabled.

49. The apparatus of claim 47, the processor further configured to:

transmit to a user equipment (UE) associated with the active HARQ process, control signaling indicating the timing threshold based at least in part on the mode that disables acknowledgement feedback reporting being configured for the UE.

50. A non-transitory, computer-readable medium for wireless communication at a user equipment (UE), the non-transitory, computer-readable medium storing code comprising instructions that are executable by a processor to:

receive a first downlink control information message comprising a first new data indication that one of new data or repeated data is to be included in a first data transmission of an active hybrid automatic repeat request (HARQ) process configured for the UE, the first data transmission scheduled by the first downlink control information message, and the first new data indication having a single bit;

receive a configuration message for configuring a mode that disables acknowledgment feedback reporting for the active HARQ process;

receive, based at least in part on the mode configured for the active HARQ process, a second downlink control information message comprising a second new data indication that one of new data or repeated data is to be included in a second data transmission of the active HARQ process, the second data transmission scheduled by the second downlink control information message, and the second new data indication having a plurality of bits; and communicate the second data transmission based at least in part on the second new data indication.

51. The non-transitory, computer-readable medium of claim 50, wherein the instructions are further executable by the processor to:
  disable acknowledgment feedback reporting for the active HARQ process based at least in part on the configuration message, the second new data indication being associated with the active HARQ process, wherein the acknowledgement feedback reporting remains enabled for a second active HARQ process configured for the UE based at least in part on the configuration message.

52. The non-transitory, computer-readable medium of claim 50, wherein the instructions are further executable by the processor to:
  receive control signaling for indicating that the second new data indication comprises the plurality of bits based at least in part on the mode that disables acknowledgment feedback reporting being configured for the UE.

53. A non-transitory, computer-readable medium for wireless communication at a user equipment (UE), the non-transitory, computer-readable medium storing code comprising instructions that are executable by a processor to:
  receive a configuration message for configuring a mode that disables acknowledgment feedback reporting for an active hybrid automatic repeat request (HARQ) process;
  receive a first downlink control information message comprising a first new data indication that new data is to be included in a first data transmission scheduled by the first downlink control information message, the first data transmission being associated with the active HARQ process;
  receive, after the first downlink control information message, a second downlink control information message comprising a second new data indication that repeated data is to be included in a second data transmission scheduled by the second downlink control information message, the second downlink control information message being associated with the active HARQ process; and
  communicate, based at least in part on the mode configured for the active HARQ process, a new set of data in the second data transmission based at least in part on a timing threshold associated with a time duration between reception of the first downlink control information message and reception of the second downlink control information message being exceeded.

54. The non-transitory, computer-readable medium of claim 53, the processor further configured to:
  receive an indication of the timing threshold, wherein the timing threshold is based at least in part on a threshold quantity of slots.

55. The non-transitory, computer-readable medium of claim 53, the processor further configured to:
  receive an indication of the timing threshold, wherein the timing threshold is based at least in part on a threshold duration.

56. A non-transitory, computer-readable medium for wireless communication at a network entity, the non-transitory, computer-readable medium storing code comprising instructions that are executable by a processor to:
  transmit a first downlink control information message comprising a first new data indication that one of new data or repeated data is to be included in a first data transmission of an active hybrid automatic repeat request (HARQ) process, the first data transmission scheduled by the first downlink control information message, and the first new data indication having a single bit;
  transmit a configuration message configuring a mode that disables acknowledgment feedback reporting for the active HARQ process;
  transmit, based at least in part on the mode being configured for the active HARQ process, a second downlink control information message comprising a second new data indication that one of new data or repeated data is to be included in a second data transmission of the active HARQ process, the second data transmission scheduled by the second downlink control information message, and the second new data indication having a plurality of bits; and
  communicate the second data transmission based at least in part on the second new data indication.

57. The non-transitory, computer-readable medium of claim 56, the processor further configured to:
  determine that a first field for indicating new data transmission or repeated data transmission has a first length that spans one bit based at least in part on a second mode that enables acknowledgement feedback reporting configured for the active HARQ process, wherein the first downlink control information message comprises the first field and the first field comprises the first new data indication.

58. The non-transitory, computer-readable medium of claim 56, the processor further configured to:
  transmit control signaling comprising a sequence of a plurality of redundancy versions.

59. A non-transitory, computer-readable medium for wireless communication at a network entity, the non-transitory, computer-readable medium storing code comprising instructions that are executable by a processor to:
  transmit a configuration message configuring a mode that disables acknowledgment feedback reporting for an active hybrid automatic repeat request (HARQ) process;
  transmit a first downlink control information message comprising a first new data indication that new data is to be included in a first data transmission scheduled by the first downlink control information message, the first data transmission being associated with the active HARQ process;
  transmit, after the first downlink control information message, a second downlink control information message comprising a second new data indication that repeated data is to be included in a second data transmission scheduled by the second downlink control information message, the second downlink control information message being associated with the active HARQ process; and
  communicate, based at least in part on the mode being configured for the active HARQ process, a new set of data in the second data transmission based at least in part on a timing threshold associated with a time duration between transmission of the first downlink control information message and transmission of the second downlink control information message being exceeded.

60. The non-transitory, computer-readable medium of claim 59, wherein the instructions are further executable by the processor to:
  determine that the mode that disables acknowledgement feedback reporting for the active HARQ process is enabled; and enable the timing threshold based at least in part on determining that the mode is enabled.

61. The non-transitory, computer-readable medium of claim 59, wherein the instructions are further executable by the processor to:

transmit to a user equipment (UE) associated with the active HARQ process, control signaling indicating the timing threshold based at least in part on the mode that disables acknowledgement feedback reporting being configured for the UE.

* * * * *